(12) United States Patent
Brown

(10) Patent No.: US 9,993,109 B2
(45) Date of Patent: Jun. 12, 2018

(54) ROTISSERIE ROD AND ADAPTOR

(71) Applicant: Keith Brown, Fort Wayne, IN (US)

(72) Inventor: Keith Brown, Fort Wayne, IN (US)

( * ) Notice: Subject to any disclaimer, the term of this patent is extended or adjusted under 35 U.S.C. 154(b) by 0 days. days.

(21) Appl. No.: 15/170,069

(22) Filed: Jun. 1, 2016

(65) Prior Publication Data

US 2017/0055768 A1    Mar. 2, 2017

Related U.S. Application Data

(63) Continuation-in-part of application No. 14/836,519, filed on Aug. 26, 2015.

(51) Int. Cl.
*A47J 37/04*    (2006.01)

(52) U.S. Cl.
CPC .................................. *A47J 37/041* (2013.01)

(58) Field of Classification Search
CPC .................................................... A47J 37/041
USPC .......... 99/340, 342, 401, 419, 421 H, 421 V; 426/523
See application file for complete search history.

(56) References Cited

U.S. PATENT DOCUMENTS

| | | | |
|---|---|---|---|
| 1,500,132 A * | 7/1924 | Hummelgard | A01B 1/022 16/110.1 |
| 2,458,239 A * | 1/1949 | Bartlett | A47J 43/18 248/175 |
| 3,075,454 A * | 1/1963 | Henyan | A47J 37/049 374/155 |
| 3,559,565 A | 2/1971 | Get | |
| 3,563,159 A | 2/1971 | Johnson | |
| 3,602,131 A | 8/1971 | Dadson | |
| 3,604,341 A | 9/1971 | Coroneos | |
| 3,611,912 A | 10/1971 | Choc | |
| 3,742,839 A * | 7/1973 | Maley | A47J 37/0745 126/25 R |
| 3,832,989 A | 9/1974 | Belford | |
| 3,866,527 A | 2/1975 | Katris | |
| 4,108,055 A | 8/1978 | Simmons | |
| 4,114,523 A | 9/1978 | Eff | |
| 4,158,992 A | 6/1979 | Malafouris | |
| D262,709 S | 1/1982 | Williams et al. | |
| D262,710 S | 1/1982 | Williams et al. | |
| D264,341 S | 5/1982 | Williams et al. | |
| 4,409,452 A * | 10/1983 | Oouchi | A47J 37/041 126/338 |
| 4,436,024 A | 3/1984 | Arden | |
| 4,442,763 A | 4/1984 | Beller | |
| 4,462,306 A | 7/1984 | Eisendrath | |
| 4,505,195 A | 3/1985 | Waltman | |
| 4,512,248 A | 4/1985 | Volakakis | |
| 4,561,418 A | 12/1985 | Cairns | |
| 4,562,771 A | 1/1986 | Williams | |
| 4,572,062 A | 2/1986 | Widdowson | |
| 4,593,613 A | 6/1986 | Waltman | |
| 4,924,766 A | 5/1990 | Hitch | |
| 4,979,439 A | 12/1990 | Ferron-Zepeda | |
| 5,025,715 A | 6/1991 | John | |
| 5,101,715 A | 4/1992 | Liu | |
| 5,140,896 A | 8/1992 | Duran | |

(Continued)

*Primary Examiner* — Thien S Tran
(74) *Attorney, Agent, or Firm* — Carson LLP; Michael D. Smith

(57) ABSTRACT

An adjustable food holding apparatus, said apparatus comprising: at least one fork assembly selectively, releasably, and slidably disposed along a rotisserie rod.

27 Claims, 26 Drawing Sheets

(56) References Cited

U.S. PATENT DOCUMENTS

| | | | |
|---|---|---|---|
| 5,224,676 A | 7/1993 | Johnston | |
| 5,419,249 A * | 5/1995 | Papandrea | A47J 37/04 99/421 HH |
| 5,460,080 A | 10/1995 | Maru, Jr. | |
| 5,515,774 A | 5/1996 | Swisher et al. | |
| 5,536,518 A | 7/1996 | Rummel | |
| 5,649,475 A | 7/1997 | Murphy et al. | |
| 5,711,209 A | 1/1998 | Guines | |
| 5,720,217 A | 2/1998 | Pappas | |
| 5,761,991 A | 6/1998 | Kambies | |
| 5,801,357 A | 9/1998 | Danen | |
| 5,845,563 A | 12/1998 | Haring et al. | |
| 5,910,332 A | 6/1999 | Fakieh | |
| 6,076,453 A * | 6/2000 | Hsu | A47J 37/041 99/419 |
| 6,104,017 A * | 8/2000 | Kim | A47J 36/027 219/732 |
| 6,142,064 A | 11/2000 | Backus et al. | |
| 6,182,560 B1 | 2/2001 | Andress | |
| 6,250,211 B1 | 6/2001 | Gongwer | |
| 6,330,853 B1 | 12/2001 | Yu | |
| 6,465,760 B1 | 10/2002 | Wong | |
| 6,526,877 B2 | 3/2003 | McConnell | |
| 6,539,843 B2 | 4/2003 | Andress | |
| 6,640,797 B1 | 11/2003 | Magers | |
| 6,658,991 B2 | 12/2003 | Backus | |
| 7,001,627 B2 | 2/2006 | Marson et al. | |
| 7,159,509 B2 | 1/2007 | Starkey | |
| 7,707,928 B1 | 5/2010 | Kamps | |
| 7,921,768 B2 | 4/2011 | Fernandez et al. | |
| 8,051,768 B2 | 11/2011 | Stephen et al. | |
| 8,272,321 B1 | 9/2012 | Kalsi | |
| 8,387,518 B2 | 3/2013 | Carpenter et al. | |
| 8,408,120 B2 | 4/2013 | Georgis | |
| 8,516,952 B2 | 8/2013 | Bennett | |
| 8,596,627 B2 | 12/2013 | Lands et al. | |
| 8,677,891 B2 | 3/2014 | Stier | |
| 8,739,693 B2 | 6/2014 | Stier | |

* cited by examiner

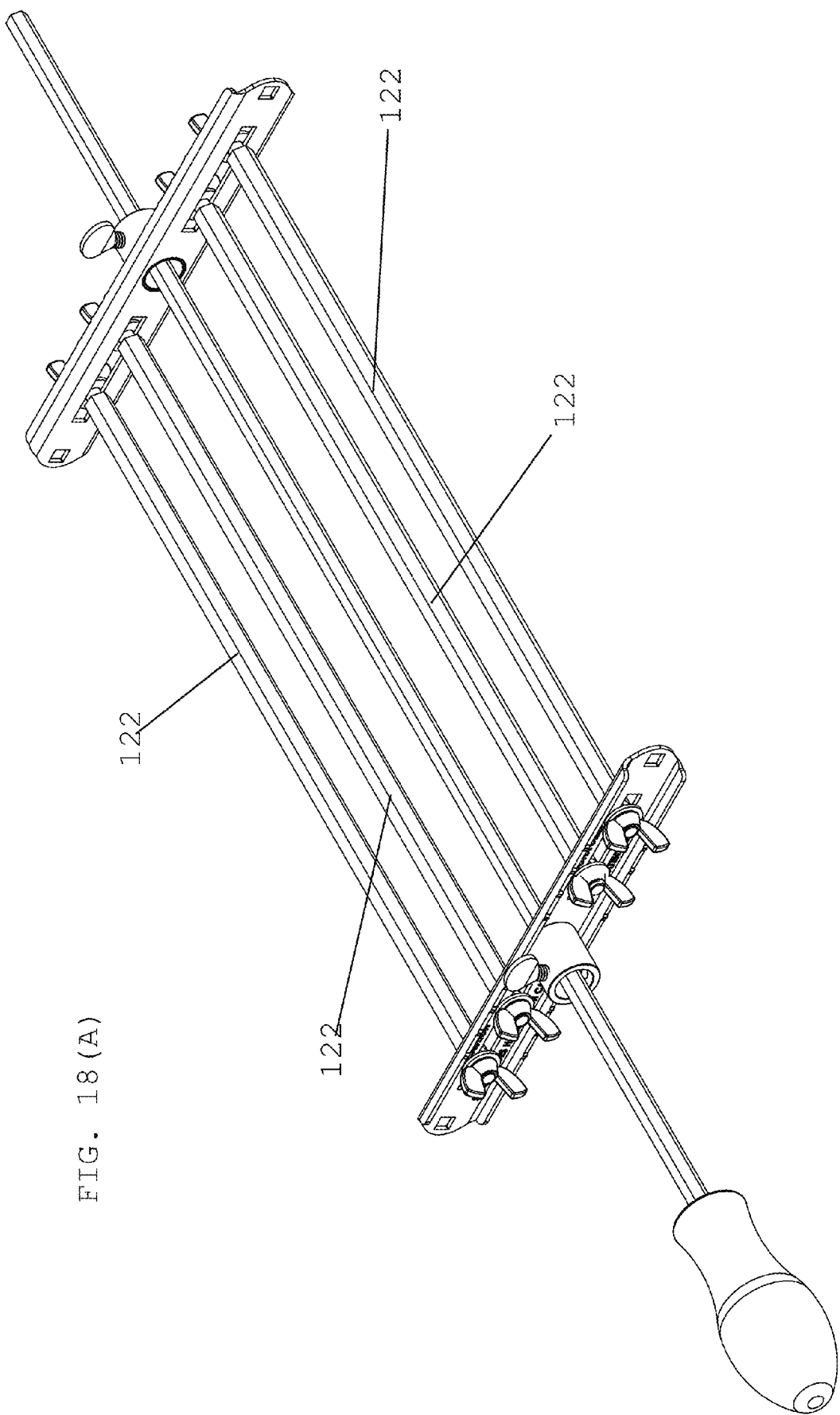

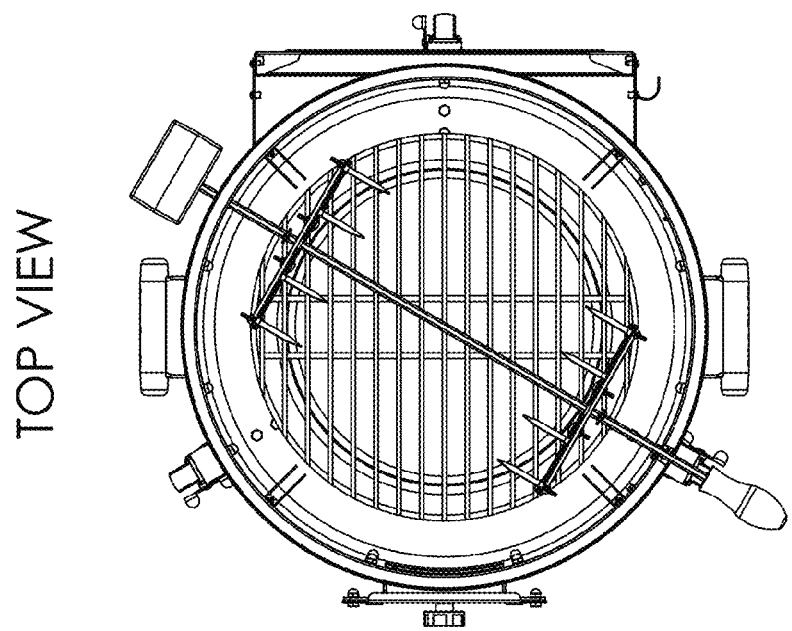
TOP VIEW
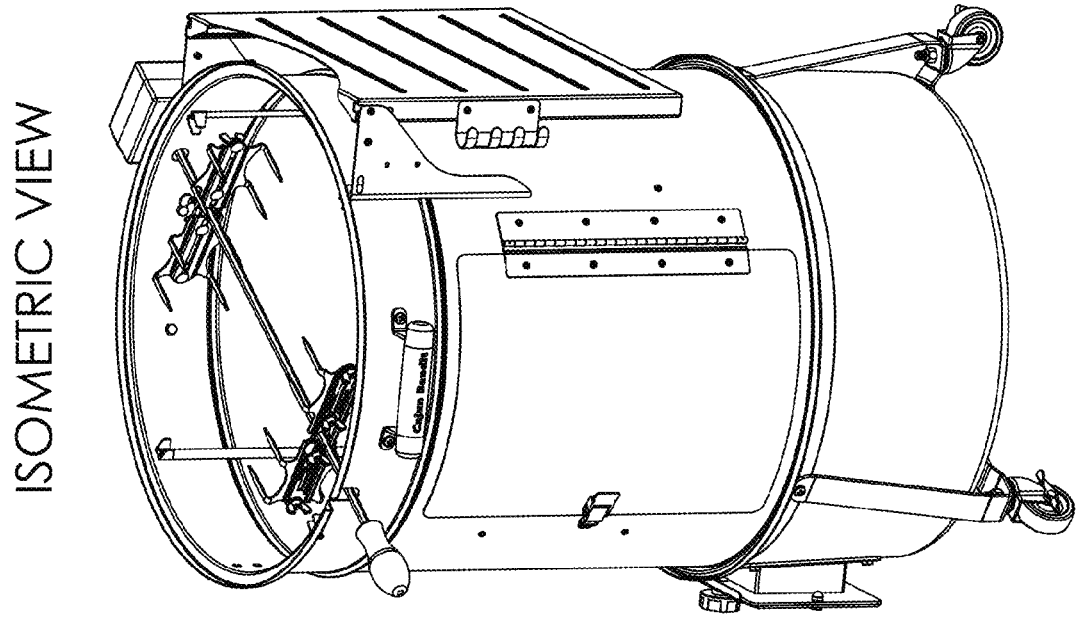
ISOMETRIC VIEW
FIG. 20

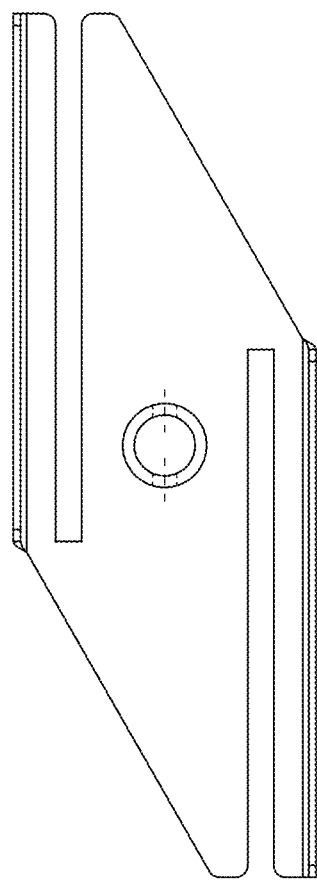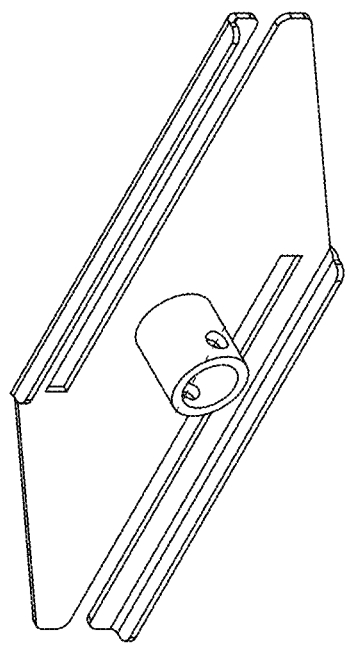
FIG. 26

ROTISSERIE ROD AND ADAPTOR

CROSS REFERENCE TO RELATED APPLICATIONS

This is a continuation-in-part of U.S. patent application Ser. No. 14/836,519, entitled "Vertical Rotisserie Adaptor", filed Aug. 26, 2015, the disclosure of which is incorporated herein by reference.

BACKGROUND

1. Field of the Invention

The present invention relates to cooking apparatuses and, more particularly, to rotisserie grill apparatuses having an adaptor to allow food to be vertically disposed while rotated over a horizontally disposed heat source.

2. Description of the Related Art

U.S. Pat. No. 3,559,565 discloses a fuel receptacle rotatably mounts a frame about a vertical axis which in turn removably supports a food holding grill assembly or rotisserie through which food may be controllably exposed to heat and smoke evolved from the receptacle. The grill assembly may be angularly displaced to a withdrawn position and to invert the food when positioned over the receptacle. The rotisserie rotates the food over the receptacle below a hood that may be mounted on the rotisserie frame.

U.S. Pat. No. 3,563,159 discloses a rotisserie or cooking appliance that includes a rotary drum that has openings therein, a shell or housing surrounding the drum and provided with a plurality of sections that are provided with members for holding food products thereon that are to be barbecued or cooked and a novel means for applying heat to the food products.

U.S. Pat. No. 3,602,131 discloses ovens of the type used in household ranges and more particularly to ranges of the self-cleaning or pyrolytic type having a rotisserie using an external drive motor.

U.S. Pat. No. 3,604,341 discloses a vertical rotisserie is provided which consists of an electric barbecue arrangement having an arcuate heating element in the general focus of which a rotatable spit is mounted. The axis is vertical so as to protect the heating element from drippings which instead are collected in a drip pan under the end of the spit.

U.S. Pat. No. 3,611,912 discloses a portable grill comprising a hinged carrying case openable to form an elongated planar grill base or counter top, legs swingable out of the case to support the base at an elevated horizontal position, sidewall forming members fitting in the case and attachable to the top of the base to form supports for hot coal holding racks also fitting in the case and selectively mountable on the sidewalls either parallel to the base or perpendicular thereto for grilling or rotisserie operation.

U.S. Pat. No. 3,742,839 discloses a rotisserie characterized in the provision of a pair of vertical spit support strips having screw clamps at their lower ends for securing on the rim of a barbecue grill firebox (or optionally to the upper ends of wood stakes driven into the ground), said support strips being provided with at least three vertically spaced apart inverted L-shaped slots including horizontal portions open at one edge of each support strip and vertical portions extending downwardly from the respective horizontal portions, the bottom or middle slot of one support strip constituting a support for a self-contained battery-operated spit drive unit which has its spit drive shaft extending through the vertical portion of a slot above that which supports the drive unit. The end of the spit remote from the drive unit is supported by the bottom of the vertical portion of the middle or top slot in the other support strip. A further, characterizing feature of the rotisserie herein is that the adjustable meat holders on the spit are of simple form having straight divergent prongs embedded in the meat being barbecued.

U.S. Pat. No. 3,832,989 discloses a charcoal firebox for use as an accessory with a rotisserie, brazier or the like comprises a metallic enclosure for a layer of burning coals, the enclosure defined by a grill removably mounted to an open face pan. The grill is formed of spring tensionable material and is spaced from and confronts the central reflector plate of the pan, the spacing between grill and central plate being less at the bottom of the grill than at the top so that an unburned or newly ignited coal fits easily between plate and grill at the top of the grill but such coals at the bottom of the grill bow the grill forwardly outwardly from the central plate, spring tensioning the grill and generating a grill restoring force causing the lower end of the grill to exert rearwardly directed force on the adjacent coals, retaining them against the central plate as the spring tensioned grill bottom moves rearwardly to follow the coals toward the central plate retaining them against the central plate as the coals are reduced in size by combustion; this structure assures that coals adjacent the top of the grill do not drop to the bottom until the coals adjacent the bottom are substantially reduced in size thereby preserving the single layer depth of coals for a prolonged period. Divider ribs on the central reflector plate divide the enclosure into three compartments, permitting burning coals to be concentrated in one or more of these compartments for improved cooking efficiency. The firebox has a handle assembly extending forwardly from the pan to permit the pan to be placed at various angles relative to the rotisserie to achieve improved cooking results. The handle assembly is weighted sufficiently that when the handle assembly is raised and lowered relative to a horizontal plane to change the angle of the pan relative to the plane, the pan will not tip rearwardly. Support means is mounted to the handle assembly and is extendable toward the brazier bowl to retain the handle at a plurality of predetermined distances above the brazier, controlling the angle between pan and brazier bowl for optimum cooking results.

U.S. Pat. No. 3,866,527 discloses a rotisserie intended for mounting on a standard broiler and which comprises a rectangular frame presenting side members of hollow construction. Received in each side member is a drive screw which is driven by a motor on one end of the frame. Each side member has an inner vertical wall which is formed with a plurality of large circular openings uniformly spaced apart. Each side member also has an outer vertical wall formed with uniformly spaced small openings in axial alignment with the openings in the inner wall. A driving cup is journaled in each pair of aligned openings. Each cup is formed with an external worm gear that meshes with a drive screw. Each cup opens onto the outer face of the inner wall and presents a non-circular recess. A sleeve for each cup is swingably mounted on a bracket secured to said inner wall above an opening therein. A spit drive shaft passes through this sleeve and its inner end carries a member corresponding in shape to the cup recess in which it is received. A spring clamp is mounted on the inner end of each spit drive shaft and detachably receives the head of a split. A supporting rod extends longitudinally of the frame midway the side members and is notched to supportingly receive the ends of spits when the latter are in horizontal positions. The spit carrying portions of the frame is of a standard size having a number of spits. The drive screws project beyond one end of the frame where they are adapted to be connected to another frame having an additional number of spits.

U.S. Pat. No. 4,108,055 discloses a mobile broiler rotisserie apparatus including a trailer frame having road engaging wheels thereon and a hitch for connection to a vehicle. The trailer frame has an open top chamber having sidewalls and a bottom wall mounted thereon with a pair of spaced support brackets being secured to opposed walls of the chamber adjacent the upper edges thereof. Rotatable food supporting devices are mounted on the support brackets in spaced relation from the bottom wall and vertically spaced above a controllable heat generator positioned in the spacing between the rotatable food supporting devices and the bottom wall for cooking foods supported on the rotatable food supporting devices. A hood is pivotally secured to one of the upper edges of the open top chamber and is movable between open and closed positions relative to the open top of the chamber. An elongated trough is mounted in the chamber in vertical alignment with the rotatable food supporting device and is inclined from one end of the chamber downwardly toward and out through an opening in the wall of the chamber at the opposite end thereof. A drive mechanism is operatively connected to the rotatable food supporting device and has a rotatable output characteristic such that the juice from food mounted on the rotatable food supporting device will fall therefrom during cooking and into the trough. The heat from the heat generator will maintain the collected juice in the trough in a liquid form so that it will flow down the incline of the trough and out through the opening for collection.

U.S. Pat. No. 4,114,523 discloses a roasting oven having a broiling element near the top of the oven liner and a rotisserie spit adapted to be supported in an elevated position from a wire frame in a broil pan seated on an oven rack. The spit is provided with a food-supporting wire basket that is attached to the spit adjacent one side edge of the basket. The basket is positioned horizontally in the oven, closely adjacent the underside of the broiling element. One end of the spit is fitted into a chuck positioned through the back wall of the oven. The chuck is driven by an oscillatory motor-drive mechanism mounted behind the oven liner, there being a long dwell period after each short oscillating movement. Hence, the food basket is capable of being inverted by the action of a downward swinging oscillating movement through an angle of 180° so as to broil both sides of the food in the basket at a distance closely adjacent the broiling element.

U.S. Pat. No. 4,158,992 discloses a combination hibachi-type grill and rotisserie comprises at least one fuel tray mounted on a base. Securing means demountably secures a pair of brackets to opposite sides of the tray in vertical arrangement. Mounting means on the brackets rotatably receives a spit longitudinally of the tray. Drive means coupled to the spit drives the same at a predetermined rotational speed.

U.S. Pat. No. 4,436,024 discloses a spit is vertically adjustably supported at one end by horizontal coaxial tubular members and a vertically adjustable standard on a fireplace hearth. The other end of the spit is removably inserted into apertures formed in a post secured to the back wall of a fireplace for horizontally supporting the spit. A crank handle, having a set screw equipped hub, surrounds the end of the tubular members opposite the fireplace back wall permitting manual or rotisserie motor drive for the spit.

U.S. Pat. No. 4,442,763 discloses a meat roaster with skeleton support which is free standing, capable of quick assembly and is adapted to be fully enclosed by sheet or foil-type metal for cooking large food items. The skeleton support comprises lower, intermediate and upper frame means. The intermediate frame means includes means for rotationally supporting a wide variety of spit basket styles and means for adjusting the height of the spit basket. The upper frame means includes opposing hoop-like members interconnected by a longitudinal support which cooperate to form a dome-shaped ceiling when enclosed. A firebox chamber is formed below the dome-shaped ceiling by enclosing the intermediate frame means. The upper frame means is manually disengageable from the intermediate frame means allowing access to the food during roasting. The lower frame means is capable of supporting charcoal baskets in the firebox chamber below and to the sides of a supported spit basket. The frame means are capable of full disassembly.

U.S. Pat. No. 4,462,306 discloses an outdoor cooking grill having a bottom grate supported in an iron framework with a food grill of parallel heat conductive bars capable of being raised and lowered relative to the grate. The apparatus includes a curved heat reflective back plate providing insulative characteristics to protect the back closure. Rotisserie supports are provided on a horizontal lift support frame which can serve selectively as a grill support and a rotisserie support. Specific lock devices are provided for rotisserie rods to position the rods in any of a plurality of positions. A composite lift bracket serves also as a rotisserie support.

U.S. Pat. No. 4,505,195 discloses a rotisserie is disclosed which includes a pair of supporting frames that rotatably support a cradle that has means for vertically adjusting the opposite ends of the rotating cradle so that the position of the cradle with respect to a source of heat may be varied. In the selected embodiment the cradle comprises a pair of end plates with a plurality of rods extending between the end plates for securing food to be cooked thereto and in which a selected number of the rods may be moved radially inward to clamp the food in position.

U.S. Pat. No. 4,512,248 discloses an improved rotisserie cooker having a multi-sided base, a vertical spit mounted for rotation thereon and upstanding tapered wall sections and a roof section forming a cooking area, heating means on the rear walls of the cooker and a pair of bifold closure doors for the front opening of a cooking compartment, each bifold door comprising a solid side panel and a front panel having a window therein, each side and front panel tapering upwardly to define with the base and wall sections of the cooker an external shape of generally hexagonal cross-section throughout the height of the cooker.

U.S. Pat. No. 4,561,418 discloses a barbecue grill for outdoor cooking has vertical spaced heating panels between which foodstuffs can be supported for cooking. One of the panels is slidable towards and away from the other panel to control the amount of heat supplied to the cooking area between the panels, and is pivotable outwards away from the cooking area about a vertical pivot axis at one side edge for easier access to the cooking area.

U.S. Pat. No. 4,562,771 discloses a flip-over drive system for a removable oven rotisserie comprising drive means, gear train means driven by the drive means, cam means mechanically coupled to the gear train means for rotation in response to the driving of the gear train means by the drive means, escapement means position for periodic engagement with the cam means, socket means mechanically coupled to the escapement means, the socket means being configured to receive a rotisserie shaft therein, whereupon the socket means and the rotisserie shaft upon being received therein are rotated to a first predetermined angular position upon engagement of the escapement means with the cam means and remain in the first predetermined angular position for a predetermined dwell period until the cam means re-engages the escapement means whereupon the socket means and the rotisserie shaft are rotated to a second predetermined angular position and remain in the second predetermined angular position for a predetermined dwell period.

U.S. Pat. No. 4,572,062 discloses a roasting machine for roasting relatively large items of food, such as small pigs or the like, includes a pair of side frame members by means of which the roasting machine may be supported for transportation along the ground or rested on the ground. A pair of end supports is secured to the side frame members and have notches which carry handlebars, which handlebars in turn carry a suspended firebox between the side frame members. The spit includes a hollow drum which receives the legs of H-shaped wire skewers to support the food on the spit. A special clamp mechanism is provided for retaining the spit drum on the support rod.

U.S. Pat. No. 4,593,613 discloses a rotisserie is disclosed which includes a pair of supporting frames that rotatably support a cradle that has means for vertically adjusting the opposite ends of the rotating cradle so that the position of the cradle with respect to a source of heat may be varied. In the selected embodiment the cradle comprises a pair of end plates with a plurality of rods extending between the end plates for securing food to be cooked thereto and in which a selected number of the rods may be moved radially inward to clamp the food in position.

U.S. Pat. No. 4,924,766 discloses a rotisserie assembly for barbecue grills is disclosed in which the motor support bracket can be arranged to support the motor in a plurality of vertically adjusted positions and the rod support bracket includes a plurality of slots for receiving the rotisserie rod. The motor bracket includes an adapter plate that can be inverted for providing two adjusted positions and which can be omitted for providing a third position.

U.S. Pat. No. 4,979,439 discloses a rotisserie for the controlled cooking of chicken carcasses or other meats in which a planar meat holding rack is rotatively mounted within a circular chamber. The planar rack is held in a generally vertical plane with carcasses mounted on either side of the rack. The rack rotates about a horizontal axis passing through its center of gravity, thus exposing the carcasses to two broilers mounted in the opposite walls of the chamber equidistantly from the rack. In the base of the rotisserie, a boiler generates a steady stream of steam which is injected into the cooking chamber to prevent charring of the meat and provide for a more even and thorough cooking. An injecting tool allows the operator of the rotisserie to spray or inject sauces or seasonings into the carcasses before or after cooking.

U.S. Pat. No. 5,025,715 discloses a tripod stand structured for supporting food holding equipment over a fire pan containing a fire, or an open campfire. The tripod has three support legs, each formed of a plurality of separable sections which snap together. The upper portion of each leg is hingedly affixed to a central collar. The central collar further defines a central bore structured for retaining a vertically oriented center rigid shaft. The lower end of the center rigid shaft is structured for releasably supporting one of several food holding accessories such as a grill, a battery powered rotisserie or a shish kebob apparatus over the fire. The central collar allows the center rigid shaft to be removed or variably adjusted in height over a wide range. Temporary stationary affixment of the center rigid shaft within the central collar is made with the use of a threadably engaged L-shaped handle, one end of which extends through a threaded bore in the sidewall of the central collar. With the center rigid shaft removed from the central collar, a vertical slot within the sidewall of the collar is exposed for releasably and adjustably retaining one end of a length of chain. The distal end of the chain is affixed with a hook for suspending a cooking pot. The tripod stand and food holding equipment can be easily disassembled and stored within the provided fire pan, which in turn can then be stored within a handled fabric carrying case.

U.S. Pat. No. 5,101,715 discloses a rotisserie comprising, a rearrangement of the infra-red heaters to a position not in direct view of the operator, so as to not expose him to its infra-red rays, and the provision of a plurality of circular food holders adjustably positionable on a vertically oriented rotisserie spit on which small items of food can be supported with the aid of food stakes. Small drip dispensers can also be disposed on the circular food holders to supply cooking fluids to food articles hung below them.

U.S. Pat. No. 5,140,896 discloses an improved rotisserie grill is provided and consists of an elongated rectangular framework having four vertical legs, one in each corner and two side cross members, each extending horizontally between two legs. A rotatable spit is supported longitudinally above the framework. An electric motor is supported on the framework to rotate the spit. A semi-cylindrical fire bowl having a curved inner surface is affixed to the framework with the side cross members supporting the bottom ends of the fire bowl. A grate is carried in the fire bowl to hold fuel thereon so that when the fuel is burned the curved inner surface of the fire bowl will reflect heat towards the rotating spit.

U.S. Pat. No. 5,224,676 discloses a universal rotisserie mounting bracket assembly is disclosed, the assembly mounting the motor on a side shelf of a barbecue grill cart for distancing the motor from the intense heat of the grill and prolonging its life. The bracket assembly is designed for vertical adjustability of the motor, ensuring compatibility with a plurality of differently configured grill castings and facilitating vertical adjustment of the rod for adjusting cooking times.

U.S. Pat. No. 5,460,080 discloses a mobile rotisserie for mass cooking of edible vertebrate products, characterized by a wheel-mounted, open pit wherein a spit conveyor travels from end to end and plural spits engage the conveyor, the spits being rapidly rotated simultaneously as they travel the length of the rotisserie unit. Cooking products are removably impaled while being releasably compressed on the spits by retainer and strap assemblies, each of which is held upon traveling rods, the latter of which engage the spit conveyor. The travelling rods and spits, per se, are removable during operation and successively transportable with the cooked product from the rotisserie.

U.S. Pat. No. 5,515,774 discloses a rotary cooker includes a cabinet assembly having a bottom, a top, opposite sidewalls, a front wall and a back wall. A door opening is formed in the front wall and is selectively closed by a door hingedly mounted on the front wall. A spit/rotisserie assembly includes a drive shaft rotatably received in bearings mounted in the cabinet assembly sidewalls, and further includes a rotisserie selectively mounted on the drive shaft for operation in a rotisserie configuration. The rotisserie can be removed from the drive shaft for operation in a spit cooking configuration. A drive assembly includes a motor drivingly connected to the drive shaft, a battery for selectively powering the motor and a photovoltaic solar collector array for charging the battery.

U.S. Pat. No. 5,536,518 discloses a convertible barbecue capable of grill cooking and rotisserie cooking. The barbecue includes one or more radiant such as briquette trays for holding refractory briquettes underneath a food item to be cooked. In the grill-cooking mode, the briquette trays are supported horizontally underneath a grill rack, while in the rotisserie mode a front briquette tray is removed and a rear briquette tray is angled so as to be out from underneath a spit for rotisserie cooking of food items. In an alternative configuration both front and rear briquette trays may be repositioned toward the rotisserie spit.

U.S. Pat. No. 5,649,475 discloses a rotisserie assembly is disclosed that comprises brackets for holding a rotisserie unit. The brackets are universally adaptable so that they can be used to support a rotisserie unit on a variety of grill styles and models. The rotisserie assembly further includes a handle for a rotisserie rod and forks that attach to a rotisserie rod and support food thereupon.

U.S. Pat. No. 5,711,209 discloses a barbecue stove has optionally a grill (27), a cooking lid (26) and/or an open top (4) on a heater section (1). A stove door (15) on a door end (2) of the heater section is sized and shaped for receiving heater means such as wood, coal, charcoal, gas burners or electrical heating elements and select vapor-producing items. A chimney end (3) of the heater section has a barbecue oven (9) into which heat, smoke, oxidation vapors and/or water vapor generated in the heater section are directed for cooking meats and other foods selectively on designedly heat-circulation shelves (10) that are positional selectively. An oven door (23, 24, 25) provides entry to the barbecue oven from a design wall and/or walls. At a front of the heater section, a suspension rack (8) is extended vertically upward from the stove top for suspending pins, rotisseries, and other means for positioning meats and/or other foods above the heater section. Mobility means such as wheels (22) can be attached to bottoms (5) of the stove and the oven. Although intended primarily for outdoor use, this barbecue stove can be used indoors by extending a chimney pipe from an exhaust outlet (11) in a lid (16) of the barbecue oven to an outdoor outlet.

U.S. Pat. No. 5,720,217 discloses a rotisserie apparatus and method of cooking food items are provided. The rotisserie apparatus includes a housing containing a heat source for supplying heat to an area above the housing. A plurality of spit supports are positioned on the housing, and extend vertically upwardly from the housing. A plurality of horizontally-disposed spits are carried by the spit supports, and located in vertically-spaced relation above the heat source for holding respective food items to be cooked. Counter-rotating sprockets are operatively connected to the plurality of spits for rotating adjacent spits in opposite directions during cooking, and permitting contacting adjacent food items to counter-rotate away from each other after engaging without being inadvertently forced off the spits.

U.S. Pat. No. 5,761,991 discloses an adjustable rotisserie basket assembly for use in a rotisserie oven that includes a basket having a mount for mounting the basket in the rotisserie oven, a bottom surface for supporting a food item, and a clamp having a surface for adjustably contacting, compressing and stabilizing the food item within the basket, wherein the clamp does not extend past the contacting surface in the direction of the food item, thus allowing the clamping means to adjust to the food item's unique dimensions.

U.S. Pat. No. 5,845,563 discloses a rotisserie cooking appliance includes a base and attached wall in the form of a vertically bisected cylinder. The base contains a centrally-located spindle for the attachment thereon of a drip pan and a spit and basket assembly. The spit and basket assembly includes a circular wire basket for containing the food item to be cooked, with a spit attached to the center thereof, the spit having an integral handle at the top to facilitate the insertion and removal of the spit and basket assembly from the rotisserie. A electric heating element is provided which is located to the rear of the rotisserie, which emits more thermal radiation near the bottom of the cooking chamber than at the top thereof. A removable aluminum reflective element is configured behind the heating element to further direct thermal radiation towards the spit and basket assembly. A single door configured as a vertically bisected cylinder made of a transparent heat resistant plastic material is provided. When the door is in the closed position, a curved slot in the top thereof secures the spit and basket assembly in place.

U.S. Pat. No. 5,910,332 discloses a rotary broiler assembly includes a rotisserie structure rotatable about a fixed axis. The rotisserie structure has a holding device radially spaced from the axis for holding a food item such as chicken thereon. When the rotisserie structure is rotated, the holding device revolves in an orbital fashion about the axis to define a path of orbital movement. A heat source is positioned within the path of orbital movement so that rotation of the rotisserie structure causes the food item to revolve about the heat source to thereby cook the food item.

U.S. Pat. No. 6,142,064 discloses a rotisserie including a countertop resting box-like enclosure housing a safety rear mounted heating element and a power rotated dual rod spit assembly. The gear driven spit assembly may be easily inserted and removed straight into and out of the enclosure without need for angling or coupling the assembly to a power drive socket. The spit assembly may also be mounted at various distances from the heating element to decrease cooking times. The open front of the enclosure is from time to time covered by an inclined glass panel door which may be opened in various ways to facilitate food insertion into and removal from the enclosure and which may be easily removed for cleaning or other purposes. The embodiment's design makes efficient use of valuable counter space by recessing back and raising off the countertop its controls. A contained light as well as room light emitted through the inclined glass door illuminate the enclosure's interior to make the rotisserie cooking into a taste tempting show. Two countertop supported sizes for the embodiment are suggested, one for larger families and entertaining, and the other for small families and singles.

U.S. Pat. No. 6,182,560 discloses a gas-fired or briquette-burning barbecue grill that outputs extremely high BTUs from a removable, vertical firebox that is backwardly inclined so as to provide a combination of direct and indirect heating. In addition, multiple cooking grids positioned at various vertical levels across the face of the firebox provide an enormous cooking area for grilling, broiling, and searing. Inclination minimizes ash avalanche during briquette burning and also increases the effective heating area applied to multiple cooking grids of gas-fired and briquette-burning grills. A top grid located directly over the firebox provides a surface for searing or high-temperature cooking (i.e., direct heating), a mid-level cooking grid provides medium temperature indirect and/or partial direct heating cooking, and a lower main cooking grid provides indirect medium temperature for broiling or baking. A pair of opposed insulated sidewalls on each side of a central heating area includes respective sets of rail guides which support cooking grids at varying distances from the firebox. The sidewalls also help confine heat in and about the cooking grids and may also support a removable, hinged cover lid that establishes an oven-like enclosure about the mid-level and main cooking grids to provide a baking/broiling chamber. Grid elements of the main cooking grid, which is downwardly inclined about three degrees toward the front of the gill, comprise oppositely facing channels that route grease drippings from cooking foodstuffs to a grease-catching receptacle. The firebox rests in a cradle or receptacle and is adapted to be easily removed by a grasp handle insertable in a surface of the firebox. A wire basket inside the metal firebox retains briquettes in spaced relation to the firebox walls thereby to provide an ash reservoir for briquettes as they burn and/or to thermally insulate hot fuels from the sidewalls and top lid of the grill. Portable versions of the grill collapse like a suitcase (with all grill components contained therein), fold-up legs may be provided, side shelves may be attachable, and/or a rotisserie rod may be added.

U.S. Pat. No. 6,250,211 discloses a barbecue mechanism according to the present invention includes a lower casing member enclosing the heating medium for the cooking process. A gear driven spit arm is located above the cooking area, and is movable from a rearward position over the cooking area outwardly by way of linkage arms, to a position proximate outer side of the lower casing member. In this manner, food to be cooked can be loaded on the spit arm for the cooking process. A multi-part cover is also included, which includes a fixed portion mounted to the lower casing member, and a pivotable portion which pivots relative to the fixed portion and defines an opening into which the spit arm rotates when it is in its fully forward position.

U.S. Pat. No. 6,330,853 discloses a rotisserie comprises an oven having a space for receiving objects used for broiling, two brackets each including at least one pair of parallel elongate openings, at least one longitudinal groove coupled the elongate openings of each pair together, at least one fastener driven through openings to secure bracket to the front or the rear side of oven, and a recess disposed at one end thereof, a motor having at least one fastening member put on one bracket, a telescopic bar with one end inserted into motor and the other end rotatably supported on the recess, and two opposite forks on the bar. The distance between a broiled thing and the fire in oven, i.e., the height of brackets and bar, may be adjusted by adjusting the positions of fasteners in openings.

U.S. Pat. No. 6,465,760 discloses a rotisserie grill includes a control device that alternates heat generation by a plurality of heating elements disposed at the periphery of a cooking chamber. The alternating heat evenly cooks food in a manner similar to a traditional rotisserie, while eliminating the need for food-rotating apparatus. The control device is a timer, which rotates a cam having a profile that actuates a switch. Heating elements are connected to the switch such that when one is energized, the other is not energized. The on/off cycle produced by the rotating cam repeats every 1 to 2 minutes. The rotisserie grill may be provided with multiple heating elements controlled by multiple switches. More than one cam may be employed to actuate the multiple switches in a complex pattern to simulate relative movement between the heating elements and the food.

U.S. Pat. No. 6,526,877 discloses a frame having a first end and a second end and a plurality of discrete heating stations spaced along the frame between the first end and the second end. A plurality of spits are moved along the frame, each spit supporting a meat product thereon. An advancement and driving mechanism advances the spits from one discrete heating station to the next in sequential fashion, and is operative to ensure that each spit resides within in the rotisserie for a pre-determined length of time to ensure that the meat is properly cooked, thereby avoiding undercooking and overcooking.

U.S. Pat. No. 6,539,843 discloses a vertical hearth barbecue grill having a removable, vertical firebox that is backwardly inclined so as to provide a combination of direct and indirect heating. Multiple cooking grids positionable at various heights across the firebox provide an substantial cooking area for grilling, broiling, and searing. Inclination minimizes ash avalanche during briquette burning. A top grid located directly over the firebox provides a surface for searing or high-temperature cooking (i.e., direct heating), a mid-level cooking grid provides medium temperature indirect and/or partial direct heating cooking, and a lower main cooking grid provides indirect medium temperature for broiling or baking. A pair of opposed insulated sidewalls help confine heat in and about the cooking grids and may also support a removable, hinged cover lid that establishes an oven-like enclosure about the mid-level and main cooking grids to provide a baking/broiling chamber. Portable versions of the grill collapse like a suitcase (with all grill components contained therein), fold-up legs may be provided, side shelves may be attachable, and/or a rotisserie rod may be added.

U.S. Pat. No. 6,640,797 discloses a new and improved grill assembly for cooking over an open fire at a campsite comprising a stake from which a grill is cantilevered outwardly and suspended over an open fire. The stake is driven into the ground or guide wire supported as desired. The grill is rotatable about the stake and adjustable along the vertical length of the stake and securable at any height above the fire by a frictional engagement with the stake. The frictional engagement comprises a binding ring disposed about the stake that binds to the stake as a result of the center of gravity being radially outward from the stake. The grill also comprises accessory pieces such as a hook for hanging a cooking pot, a secondary grill platform for more grilling space, for warming, or for support for a cutting board, and a rotisserie attachment for slow roasting food. The accessories are each secured to the stake above the grill or below the grill, as desired, by frictional engagement with the stake. This frictional engagement is by a helical ring that can be attached or removed laterally or angularly instead of coaxially or longitudinally of the stake. The grill and each of the accessories each are of steel or iron construction, and corrosion and other wear scours and actually enhances the binding action of the frictional engagement means for the grill and each of the accessories.

U.S. Pat. No. 6,658,991 discloses a rotisserie spit kit adapted to use on a barbeque grill. The rotisserie spit assembly includes a spit rod, a circular set of geared teeth, and two stud axles. It is preferred that the assembly include two spit rods. The kit also includes two brackets that can be mounted onto the barbeque grill. The kit also includes a motor that can be mounted onto one of the brackets. The motor includes a drive shaft and a drive gear. Each of the brackets have a plurality of detents or recessed positions that can receive one of the stud axles such that the spit rods are in a generally horizontal position.

U.S. Pat. No. 7,001,627 discloses a rotisserie oven comprising a central heating section having a vertical orientation and dividing the cooking space into two equal, independent, and evenly heated roasting chambers; at least two rotisserie rods each driven by a motor; at least two removable basting troughs positioned above the rotisserie rods; at least two drip collection pans positioned below the rotisserie rods; an ash drawer positioned below the central heating section; and a control panel. By inserting a basting fluid in the basting trough, the roasting meat is automatically basted with the dripping basting fluid. The excess basting fluid and the meat juices is collected and can easily be recycled during the roasting process. By providing parts that are removable and have a simple mechanical design, cleaning and maintenance can be kept at a minimum. Mounting the rotisserie oven on top of cabinet results in added convenience, accessibility, and flexibility.

U.S. Pat. No. 7,159,509 discloses an outdoor cooking machine including a combination of horizontal and vertical smoker/grills. A vertical smoker/grill is connected to a horizontal smoker/grill by a tube with a damper. A variety of outdoor cooking techniques are provided, singly or in combination, by the outdoor cooking machine. Among these cooking techniques are: cold/slow smoking, hot smoking, steaming, double boiling, deep frying, stewing, food warming, spit/rotisserie cooking, conventional grilling, baking, an open firepit function, an outdoor fireplace function, and a tabletop function. Some cooking techniques use a single fire while others combine multiple fires from one or more smoker/grills to enhance and/or change cooking options.

U.S. Pat. No. 7,707,928 discloses a vertical rotisserie sub-assembly, comprising: (a) a housing; (b) a motor; (c) an energy source; (d) a switch; (e) a rotating member; (f) a lower suspending member; and (g) an upper suspending member.

U.S. Pat. No. 7,856,924 discloses a cooking apparatus has a food support with food engaging structure, such as a rotisserie spit. A firebed is mounted under the food support to heat food at the food support. A heat reflective vault is mounted over the food support for reflecting radiant heat back down toward the food support. The vault extends over the food support while still providing access from the side. A drive mechanism can vertically adjust the firebed to adjust heat flowing toward the food support. An elevator motor may be coupled to the drive mechanism for vertically positioning the firebed. A thermostat responsive to heat from the firebed and coupled to the elevator motor can control elevation of the firebed.

U.S. Pat. No. 7,921,768 discloses a stand-alone oven capable of being utilized in both the horizontal and vertical orientations/positions to, among other functions, provide for rotisserie cooking of foodstuffs. The oven includes a rotisserie attachment that is adjustable to rotate in the oven in the horizontal and vertical orientation. A control panel is coupled to the oven to control the operation of the oven and includes a screen that is rotatable to be viewable in the horizontal and vertical orientation of the oven.

U.S. Pat. No. 8,051,768 discloses a retractable rotisserie driver which is used in connection with a barbecue grill is described and shown herein. In one embodiment, a retractable motor support apparatus is pivotably connected to a side shelf assembly of a barbecue grill, and is movable between a storage position, where the rotisserie motor is substantially enclosed by the side shelf assembly, and a usage position, where the motor is generally aligned for engagement with a rotisserie spit. The support apparatus includes a first wall and a second wall which are adjacent and generally transverse to one another. The first wall is configured to be aligned generally flush with an upper surface of the side shelf assembly when the support apparatus is moved to the storage position to increase the usable work area on the shelf. The second wall is provided with a power cord holder for compactly holding the motor's power cord when the apparatus is moved to the storage position. The side shelf assembly and support apparatus are also provided with corresponding latch mechanisms which are adapted to engage when the support apparatus is moved to the usage position.

U.S. Pat. No. 8,272,321 discloses a removable rotisserie accessory for an oven includes a motor assembly positionable beneath a floor of the oven to provide rotational energy about a vertical axis perpendicular to the floor of the oven. A vertical rod is insertable through an opening in the floor of the oven to engage the motor assembly and to rotate about the vertical axis. A horizontal rod has a first end supported by the vertical rod and has a second end supported proximate to a sidewall of the oven. The horizontal rod supports at least one engagement device for an item to be cooked. A miter gear assembly includes a first bevel gear mounted on the vertical rod to rotate with the vertical rod and includes a second bevel gear mounted on the horizontal rod to rotate the horizontal rod in response to rotation of the first bevel gear.

U.S. Pat. No. 8,387,518 discloses a vertical rotisserie open flame oven having a central flame post dispersing aesthetically pleasing flames and a secondary heater positioned outside the path of rotation of the food items. The oven has a central chamber area where the heat transfer to the food items is executed in a desirable manner to properly cook the food items without burning the surface thereof.

U.S. Pat. No. 8,408,120 discloses a generally vertically disposed rotisserie broiler. The broiler includes a metal housing with side walls, a floor, and an open end. One or more burners are disposed on opposite side walls of the housing. A generally vertically disposed spit is normally contained within the confines of the metal housing, but is movable towards the open end of the housing. The spit is rotated by a motor. The rotisserie broiler also includes an upper generally horizontal arm, and a lower generally horizontal arm, positioned adjacent an upper end and a lower end of the spit, respectively, for moving the spit transversely within the housing.

U.S. Pat. No. 8,516,952 discloses a rotisserie broiler for skewered food items is provided. In one embodiment, the rotisserie broiler includes a horizontal conveyor defining a horizontal path of travel between a skewer receiving area and a transfer channel, the horizontal conveyor having a parallel pair of feeder chains to endlessly convey at a same rate to the transfer channel and a vertical conveyor disposed perpendicular to the horizontal conveyor at the transfer channel and defining a vertical path of travel between the transfer channel and a dispenser, the vertical conveyor having a parallel pair of rotisserie chains to endlessly convey at the same rate from the transfer channel to the dispenser. The food items are placed into the rotisserie broiler on a conveyor in a generally horizontal plane and automatically picked up by a conveyor in a vertical plane to be broiled and rotated adjacent to heating elements and then dispersed.

U.S. Pat. No. 8,596,627 discloses an automobile rotisserie including a pair of support columns, a neck clamp clamped to each support column, a rotation assembly attached to each neck clamp, a swing arm clamp attached to each rotation assembly, a swing arm received in and clamped by each swing arm clamp, a balancing assembly effective for controlling the movement and positioning of the swing arm within the swing arm clamp, and a mounting arm extending from each swing arm. Each neck clamp and/or swing arm clamp may include an L-shaped outer clamp plate and a W-shaped inner clamp plate. Each rotation assembly may include an outer sleeve attached to a neck clamp, an inner insert sleeve attached to a swing arm clamp, a plurality of ball bearings between the outer sleeve and the inner sleeve to facilitate rotational movement of the inner sleeve within the outer sleeve, and a retainer bearing to retain the inner sleeve within the outer sleeve. The balancing assembly may include a threaded balancer block attached to a swing arm clamp, an unthreaded balancer block attached to a swing arm, a threaded rod extending through the threaded balancer block and through the unthreaded balancer block, a gripping head at one end of the threaded rod, a thrust bearing assembly sandwiching the unthreaded balancer block, and a locking collar fixed to the threaded rod adjacent the thrust bearing assembly and the unthreaded balancer block.

U.S. Pat. No. 8,677,891 discloses a compact portable charcoal-fired barbecue cooker is convertible for rotisserie cooking or for grill cooking. The cooker has a fire basket or charcoal grate, which can swing or rotate between a lowered, horizontal position, used for grilling, and a raised or upright position, used for rotisserie cooking, by turning a handle positioned outside the cooker body. The rotisserie spit drops into receptacles formed in the left and right side walls of the cooker body, and with the charcoal grate upright, a drip pan can be positioned under the spit. The vents are positioned so the heated air flows over the roast. A reflector or heat shield is positioned between the upright fire basket and the rear wall of the cooker. A locking tab can releasably retain the handle in the upright position. The entire cooker can be picked up using the handle affixed to the lid.

What is needed in the art is an apparatus that holds food over the cooking space of a grill such that the cooking space is maximized and such that the physical profile of the food is as narrow as possible for more even heat distribution and the less chance of burning.

SUMMARY

In one exemplary embodiment, the present invention comprises an adjustable food holding apparatus, said apparatus comprising: a base, said base having a generally flat rectangular shape, a top surface, and a bottom surface, said base further comprising a cylindrical bore disposed between said top surface and said bottom surface; a cylindrical connector, said connector fixedly attached to said bottom surface of said base; at least one adjustable fork assembly, said fork assembly having a base, said base having a generally flat rectangular shape, a top surface, a bottom surface, opposing sides, said base further comprising at least one prong attached to each opposing side of said base of said fork assembly, said prong extending perpendicularly relative to said base, said bottom of said base of said at least one fork assembly selectively, releasably, and slidably disposed against said top of said base of said adjustable food holding apparatus; a rod, said rod selectively, slidingly, releasably disposed through said cylinder of said base of said apparatus.

In another exemplary embodiment, the present invention comprises a collapsible basket for storing food while it is being cooked, said basket comprising: an external sleeve, said sleeve having an extruded generally cuboid shape, five sides, and a volume; an internal reciprocating member, said reciprocating member comprising an extruded generally cuboid shape, five sides, and a volume, said volume of said reciprocating member smaller than the volume of said sleeve, where said reciprocating member is slidably disposed within said sleeve such that said basket has six sides.

In another exemplary embodiment the present invention may comprise first and second nested cylinders.

In another exemplary embodiment, the present invention comprises a variable volume basket for storing food while it is being cooked over a heat source, said basket comprising: a laterally expandable external sleeve, said sleeve having an extruded generally cuboid shape, five sides, and a volume; a laterally expandable internal reciprocating member, said reciprocating member comprising an extruded generally cuboid shape, five sides, and a volume, said volume of said reciprocating member smaller than the volume of said sleeve, where said reciprocating member is slidably disposed within said sleeve such that said basket has six sides, and wherein said basket is expandable or collapsible vertically and horizontally.

In another exemplary embodiment, the present invention comprises an adjustable food holding apparatus, said apparatus comprising: a base, said base having a generally flat rectangular shape, a top surface, and a bottom surface, said base further comprising a cylindrical bore disposed between said top surface and said bottom surface, said base further comprising a cylindrical connector, said connector fixedly attached to said bottom surface of said base; at least one adjustable fork assembly, said fork assembly having a base, said base having a generally flat rectangular shape, a top surface, a bottom surface, opposing sides, said base further comprising at least one prong attached to each opposing side of said base of said fork assembly, said prong extending perpendicularly relative to said base, said bottom of said base of said at least one fork assembly selectively, releasably, and slidably disposed against said top of said base of said adjustable food holding apparatus.

BRIEF DESCRIPTION OF THE DRAWINGS

The present invention will be understood more fully from the detailed description given hereinafter and from the accompanying drawings of the preferred embodiment of the present invention, which, however, should not be taken to limit the invention, but are for explanation and understanding only.

In the drawings:

FIG. 18(A) shows an alternative embodiment of the apparatus in FIG. 18.

FIG. 20 shows an example of the present invention disposed above a heat source.

FIG. 26 shows several alternative examples of a component of the present invention.

Corresponding reference characters indicate corresponding parts throughout the several views. The exemplary embodiments set forth herein are not to be construed as limiting the scope of the invention in any manner.

DETAILED DESCRIPTION OF THE EMBODIMENTS

The present invention will be discussed hereinafter in detail in terms of various exemplary embodiments according to the present invention with reference to the accompanying drawings. In the following detailed description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessary obscuring of the present invention.

Thus, all of the implementations described below are exemplary implementations provided to enable persons skilled in the art to make or use the embodiments of the disclosure and are not intended to limit the scope of the disclosure, which is defined by the claims. As used herein, the word "exemplary" or "illustrative" means "serving as an example, instance, or illustration." Any implementation described herein as "exemplary" or "illustrative" is not necessarily to be construed as preferred or advantageous over other implementations. Moreover, in the present description, the terms "upper", "lower", "left", "rear", "right", "front", "vertical", "horizontal", and derivatives thereof shall relate to the invention as oriented in FIG. 1.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
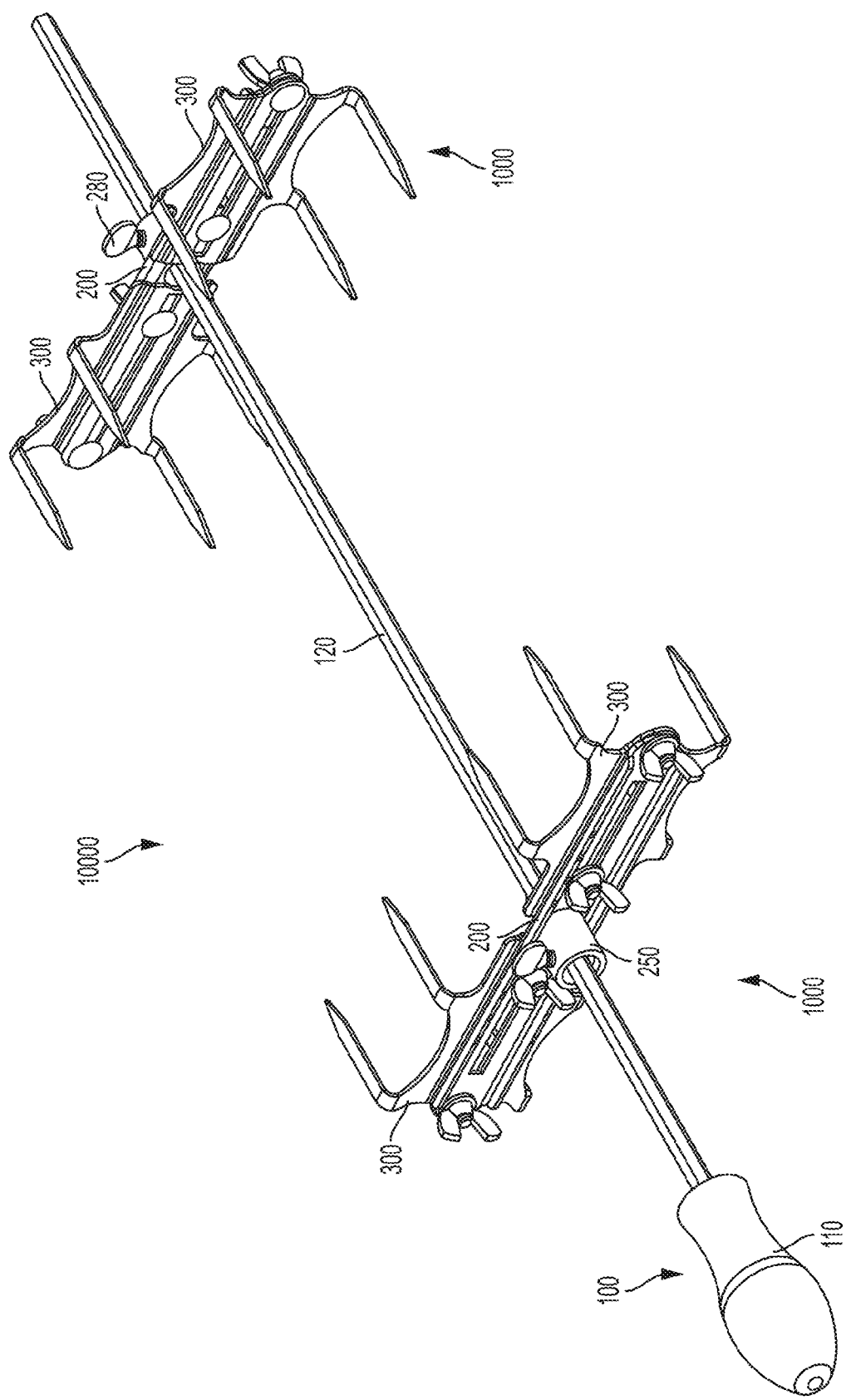
FIG. 1 shows a perspective view of an exemplary embodiment of the present invention.

Referring first to FIG. 1, there is shown a perspective view of cooking apparatus 10000. Cooking apparatus 10000 generally comprises horizontally disposed rotisserie rod 100 and rotisserie adaptors 1000 each of which further comprises a base 200, a connector 250, and a pair of slidable forks 300. As shown in FIG. 1, rotisserie rod 100 is disposed generally horizontally. Rotisserie rod 100 comprises an elongated shaft 120 having a longitudinal axis. Rotisserie rod 100 preferably comprises a heat resistant durable material such as stainless steel or aluminum. However, any polymer, composite, or ceramic having the necessary material characteristics of mechanical durability as well as heat and corrosion resistance can also be used.

Shaft 120 of rotisserie rod 100 may comprise the shape of any extruded regular or irregular polygon, such as a cylindrical shape, extruded octagon, or elongated cuboid shape. Rotisserie rod 100 further comprises a knob or handle 110 disposed on one end of rotisseries rod shaft 120. Knob 120 is used to manually rotate shaft 120 of rotisserie rod 100. It is, however, within the scope of the present invention, for knob 110 to instead comprise a hand crank. Moreover, an automated device such as a hydraulic or an electric motor may be used to rotate shaft 120 of rotisserie rod 100 about its longitudinal axis. (As illustrated in FIG. 18(B), rotisserie rod 100 and other rotisserie rods generally further comprise at least one pointed end for skewering meat or other foods for cooking above a heat source.)

Referring still to FIG. 1, there is shown a pair of rotisserie adaptors 1000. As illustrated in FIG. 1, each rotisserie adaptor 1000 is selectively and slidably attached to shaft 120 of rotisserie rod 100. Rotisserie adaptors 1000 generally comprise a base 200, a cylindrical connector 250, and a pair of slidable fork devices 300. Preferably all components of adaptors 1000 comprise a durable heat and corrosion resistant material such as stainless steel or aluminum. However, any polymer, composite, or ceramic having the necessary material characteristics of mechanical durability as well as heat and corrosion resistance can also be used.

Figure 2:
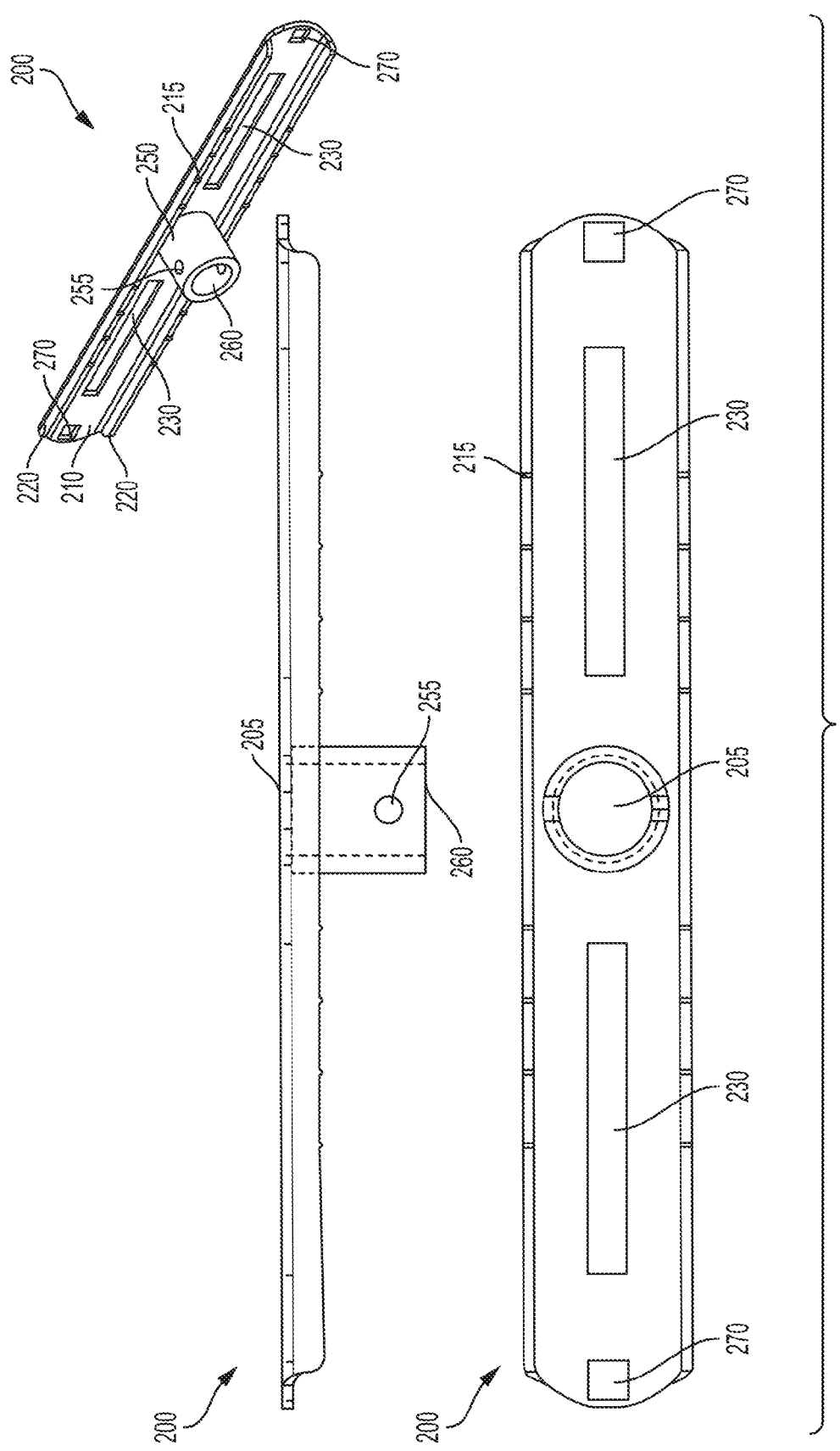
FIG. 2 shows perspective side, and top views of a component of an exemplary embodiment of the present invention.

Referring now to FIG. 2, there is shown a perspective, top, and side view of base 200 of adaptor 1000. As illustrated in FIG. 2, base 200 of adaptor 1000 comprises a generally flat rectangular bottom 210. Bottom 210 of base 200 further comprises elongated shape with a pair of flanges 220 extending perpendicularly from opposing longer sides of bottom 210. Bottom 200 further comprises a cuboid or cylindrically shaped bore 270 disposed through bottom 210 at opposing ends of bottom 210. Bottom 210 further comprises a central bore 205 disposed through bottom 210 and a pair of elongated slots 230 disposed through bottom 210 of base 200. Each slot 230 is disposed on one side of central cylindrical bore 205. Cylindrical connector 250 is fixedly attached to the center of bottom 210 and extends perpendicularly from bottom 210 from the same side and in the same direction as flanges 220. Cylindrical connector 250 further comprises longitudinal bore 260. Bore 260 of cylindrical connector 250 is collinear with central bore 205 of bottom 210 of base 200. Bottom 210 of base 200 may further comprise visual distance markers 215 disposed along the longer sides of bottom 210.

Figure 3:
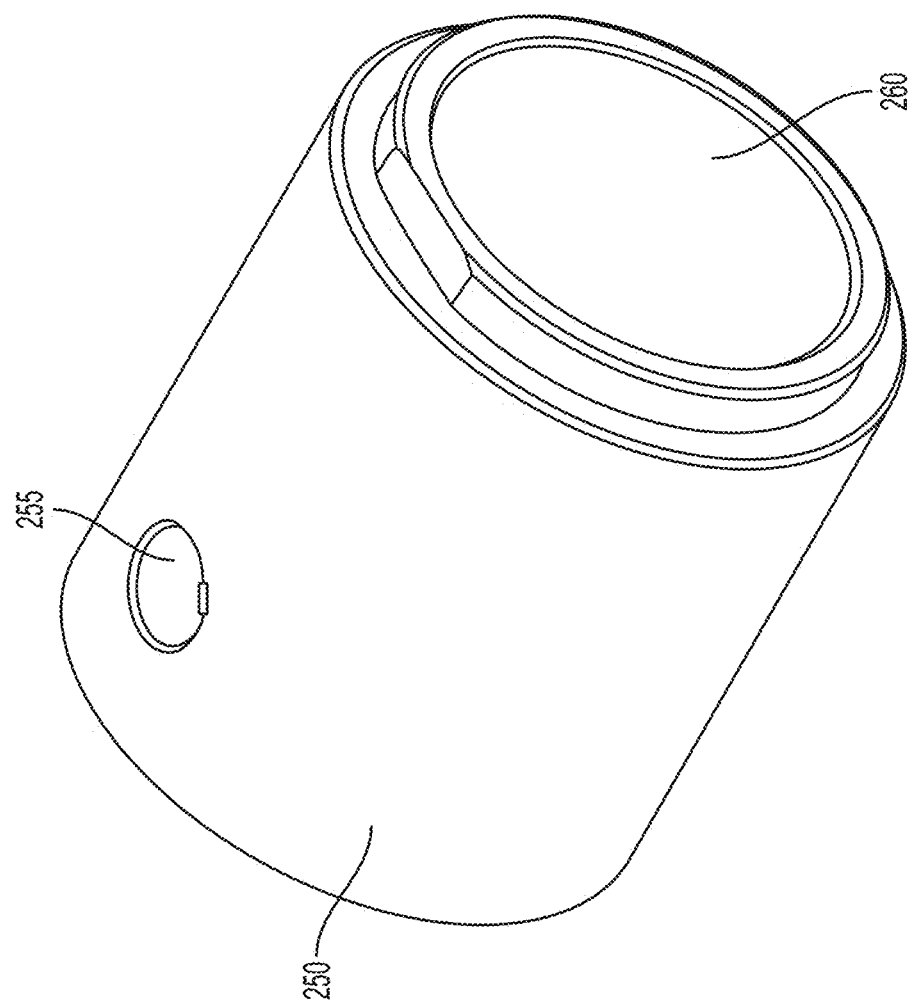
FIG. 3 shows a perspective view of another component of an exemplary embodiment of the present invention.

Referring now to FIG. 3, there is shown a perspective view of cylindrical connector 250. As illustrated in FIG. 3, connector 250 comprises a cylindrical shape having a longitudinal bore 260. Connector 250 further comprises at least one cylindrical side bore 255 disposed through the side wall of connector 250 such that the central longitudinal axis of bore 255 is perpendicular to the central longitudinal axis of bore 260 of connector 250. Bore 255 is threaded and adapted to accept a threaded fastener or set screw 280 as shown in FIG. 1.

In a preferred embodiment, cylindrical connector 250 comprises at least two bores 255. The addition of at least a second bore 255 provided redundancy in the event that one of the bores becomes inoperable. Ideally, the second bore 255 is collinear with and disposed through cylindrical connector 250 opposite the first bore 255. Thus, if one bore become inoperable, adaptor 1000 may still be oriented in any desired rotation relative to rod 100. Alternatively, bores 255 may be at a desired angle or comprise any number. Bores 255 in combination with screws 280 may also be used to selectively adjust the radial position of rotisserie rod 100 within bore 260.

Referring again to FIG. 1, shaft 120 of rotisserie rod 100 slides though cylindrical connectors 250 of adaptors 1000. Once each adaptor 1000 is in a desired linear location and desired rotational orientation, set screw 280 is threadably engaged through bore 255 of cylindrical connector 250 to hold adaptor 1000 and shaft 120 of rotisserie rod 100 in place relative to one another in a desired position and orientation. Adaptors 1000 may face toward one another, in opposing directions, in the same direction toward the proximal end of rod 100, or in the same direction toward the distal end of rod 100. Additionally, there is no upper or lower limit (other than space) to how many adaptors 1000 may be placed along rod 100.

In a preferred embodiment, set screw 280 comprises a thumb screw design so that it can be tightened or loosened by hand without the need for tools. As illustrated in FIG. 1, rotisserie adaptors 1000 further comprise movable forks 300.

Figure 4:
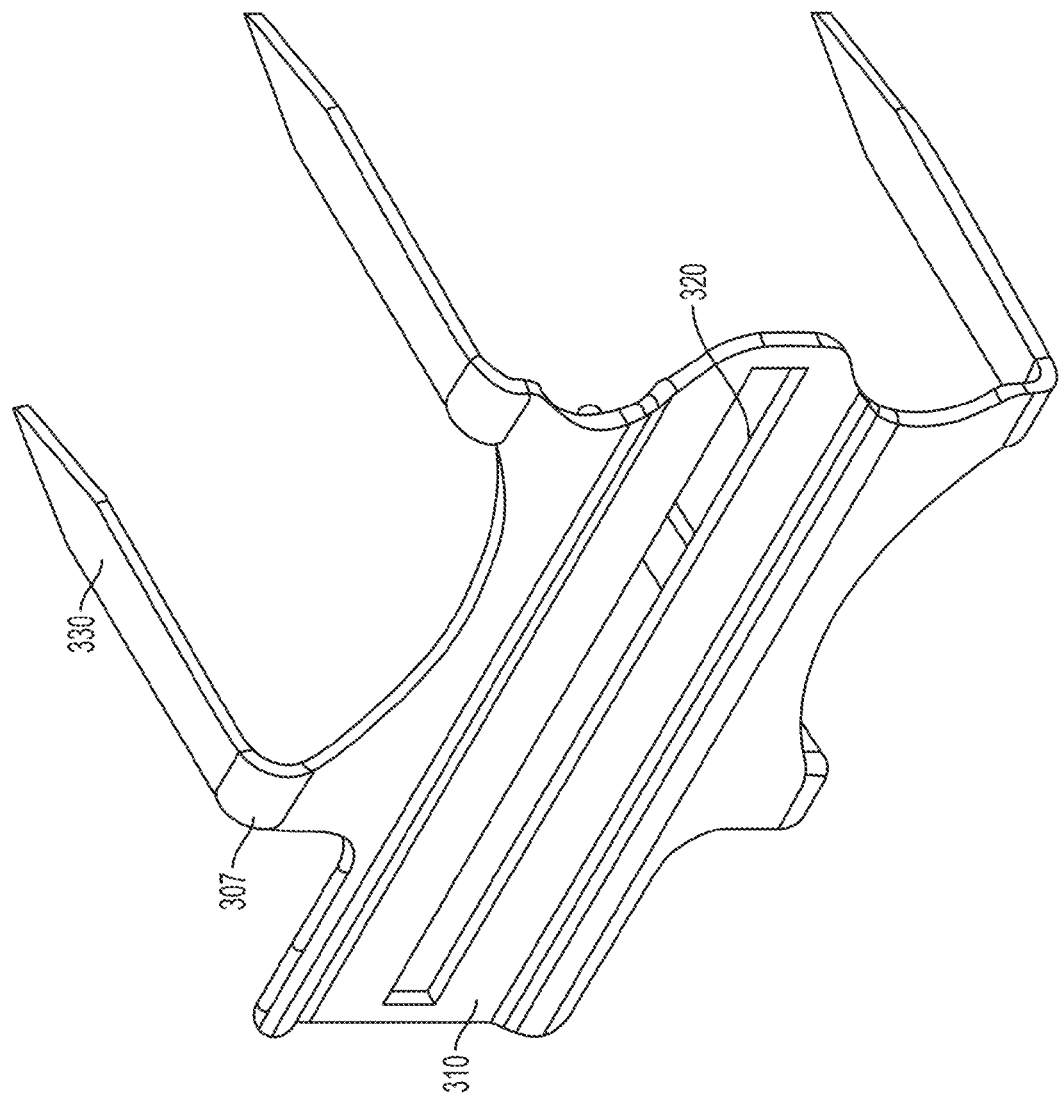
FIG. 4 shows a perspective view of another component of an exemplary embodiment of the present invention.

Referring now to FIG. 4, each movable fork 300 comprises a bottom 310 having a generally flat elongated shape. Bottom 310 further comprises an elongated central slot 320 disposed through bottom 310. Movable forks 300 further comprise prongs 330 that extend perpendicularly from bottom 310 of each movable fork 300. In one exemplary embodiment, two parallel prongs 330 are fixedly attached to bottom 310 and extend from opposing sides of bottom 310. Each prong 330 preferably comprises a pointed distal end opposite the end fixedly attached to bottom 310. It is within the scope of the present invention that prongs 330 may be of any desired length. In fact, each prong 330 may have a unique length relative to other prongs 330.

Figure 5:
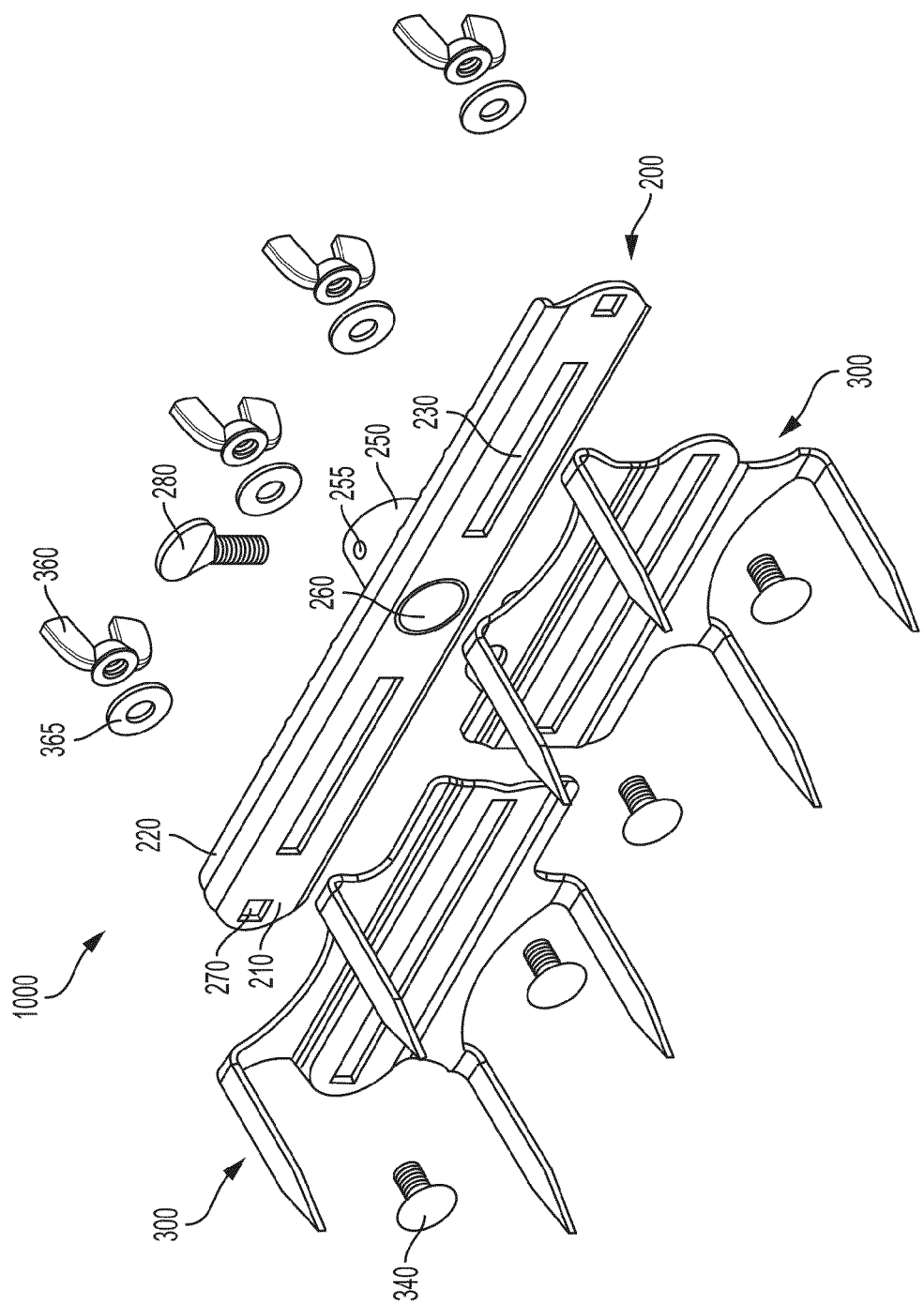
FIG. 5 shows an exploded assembly view of the components in FIGS. 2, 3, & 4.

Referring now to FIG. 5, there is shown an exploded assembly view of adaptor 1000 comprising base 200, connector 250, forks 300, thumb screw 280, bolts 340, wing nuts 360, and washers 365. As illustrated in FIG. 5, forks 300 are slidably releasably mounted to the front of base 200 using threaded bolts 340 in combination with wing nuts 360. In a preferred embodiment, washers 365 are disposed between wing nuts 360 and the back of base 200. Wing nuts 360 allow forks 300 to be attached to base 200 by hand without the need for tools.

Referring still to FIG. 5, bolts 340 are disposed through slots 230 of base 200 and slots 320 of forks 300. Bolts are tightened or loosened as desired using wing nuts 360 to move forks 300 radially from the center of base 200.

Figure 6:
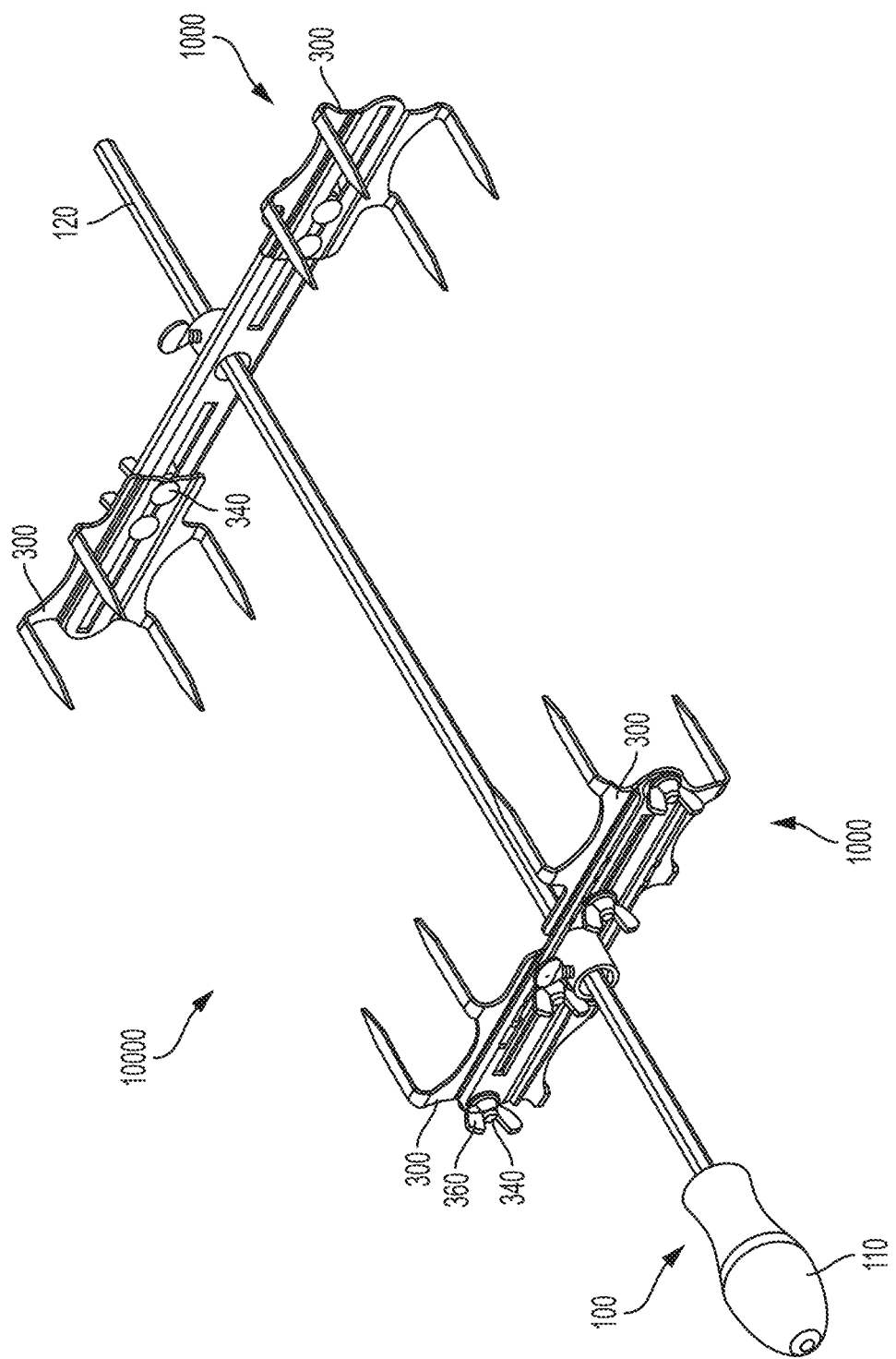
FIG. 6 shows a perspective view of an exemplary embodiment of the present invention.

Referring new generally to FIG. 6, there is shown cooking apparatus 10000. In one exemplary embodiment, at least one adaptor 1000 is releasably, slidingly, and selectively attached to shaft 120 of rod 100. Preferably, two adaptors 1000 are disposed linearly along shaft 120 of rotisserie rod 100 such that the points of prongs 330 of each adaptor 1000 face one another.

Referring still to FIG. 6, shaft 120 of rod 100 is disposed through cylindrical connector 250 and bore 205 of base 200 of adaptor 1000. Thumb screw 280 is selectively engagable through bore 255 to hold adaptors 1000 in place along shaft 120 of rotisserie rod 100.

Referring still to FIG. 6, there is shown forks 300 movably attached to base 200 of adaptor 1000. As illustrated in FIG. 5, one movable fork 300 is slidingly attached to each side of base 200. Each fork 300 is place on the top of one side of base 200 such that side of movable forks 300 without prongs 330 slides along the top (i.e. side opposite cylindrical connector 250). When each movable fork 300 is attached to base 200, slot 320 of fork 300 is parallel to and above slot 230.

Bolts 340, as illustrated in FIG. 6, are disposed through slots 320 and 240 such that each fork 300 is slidingly attached to one side of base 200. Each fork 300 can thus move independently radially in or out from shaft 120. Once any fork 300 is in a desired location, a wing nut 360 is attached to bolt 340 on the side of base 200 comprising connector 250 to hold fork 300 in place radially relative to shaft 120. In one exemplary embodiment, one fork 300 is attached to each opposing side of base 200 on either side of bore 205.

Figure 7:
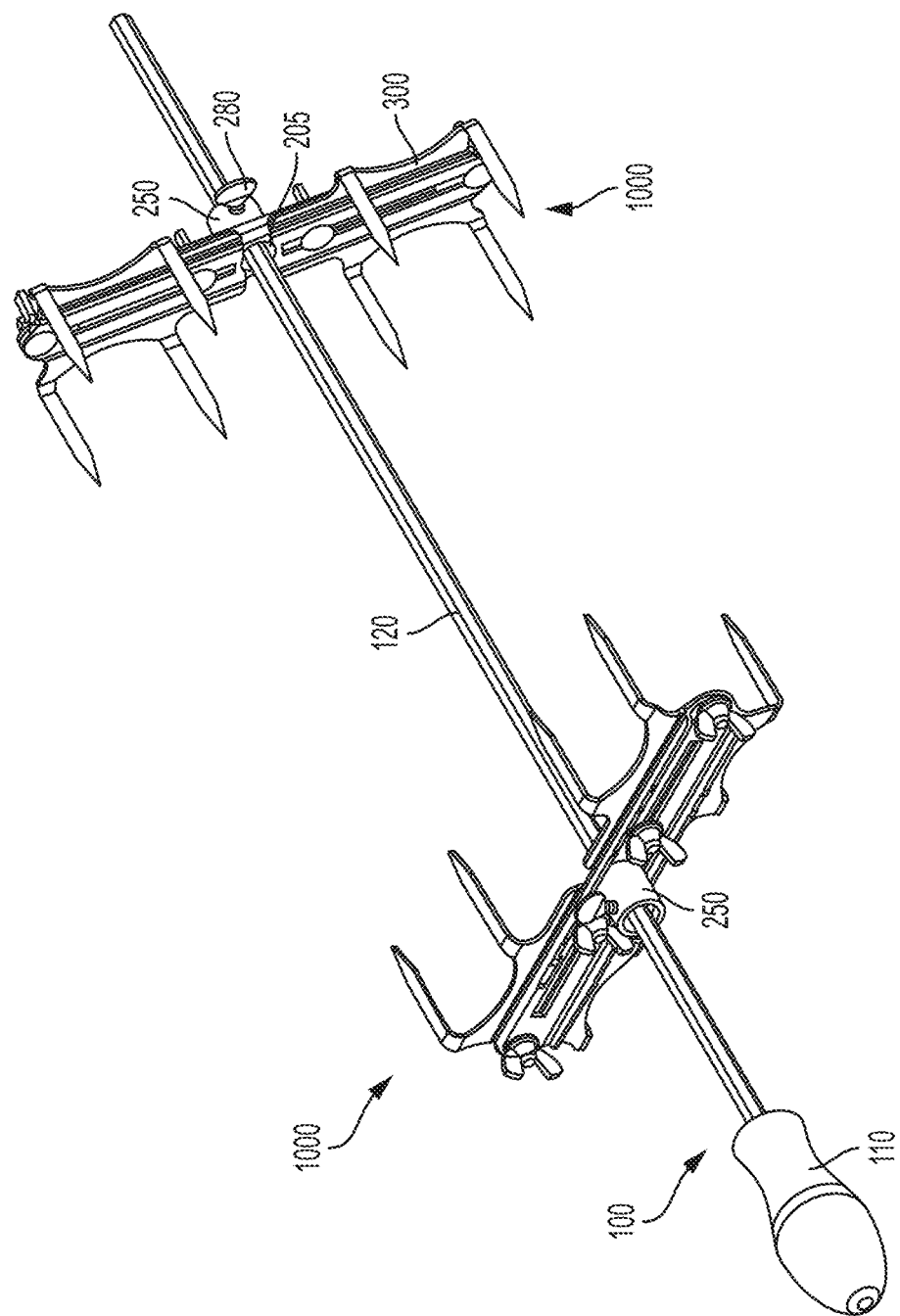
FIG. 7 shows a perspective view of an exemplary embodiment of the present invention.

Referring now to FIG. 7, there is shown a perspective view of cooking apparatus 10000. As illustrated in FIG. 6, adaptors 1000 are linearly movably attached to shaft 120 of rotisserie rod 100. Additionally, each fork 300 is slidably attached to base 200 such that each movable fork 300 is radially movable relative to shaft 120 of rotisserie rod 100.

Figure 11:
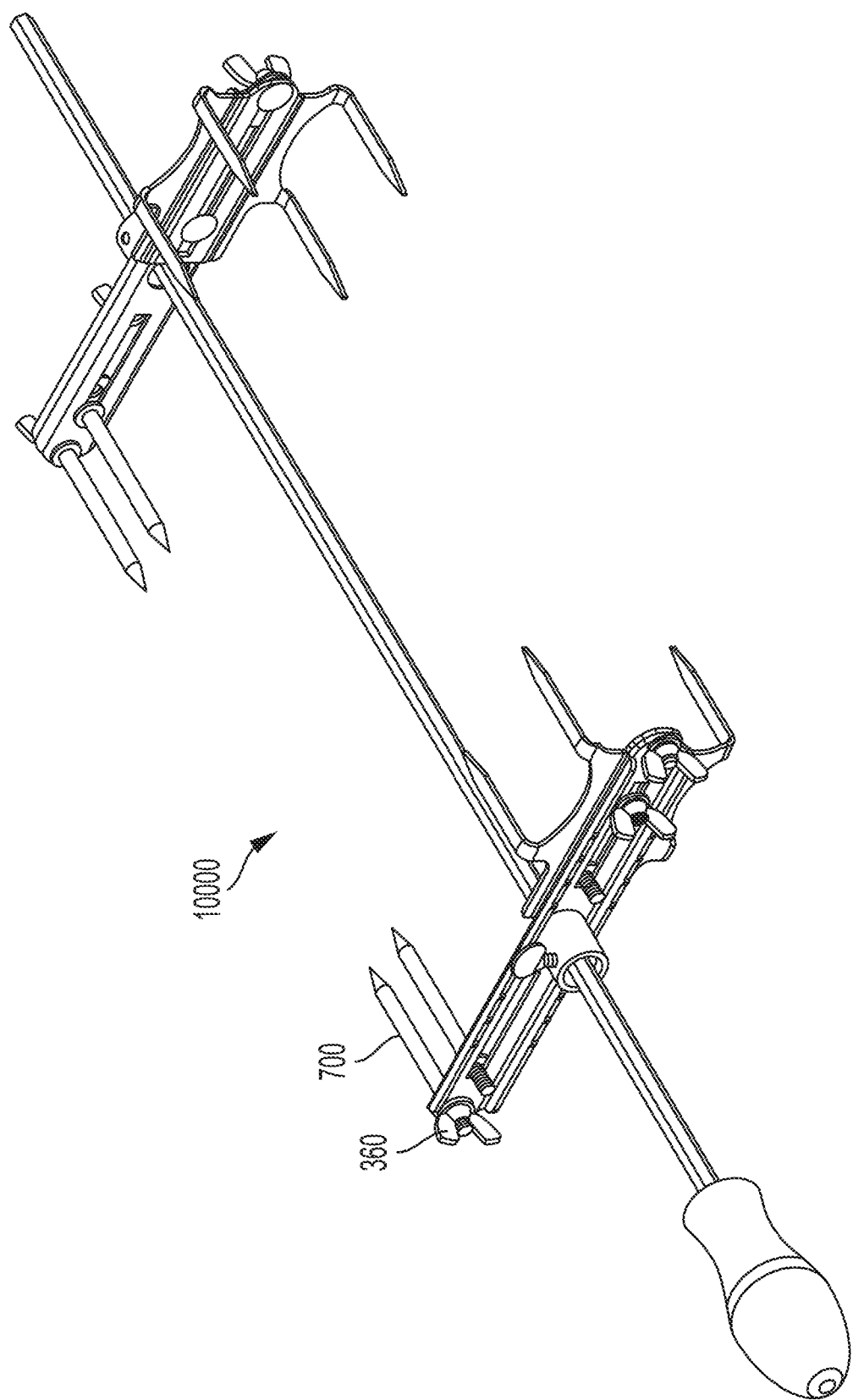
FIG. 11 shows a perspective view of another alternative exemplary embodiment of the present invention.

In an alternative embodiment, shown in FIG. 11, one or more movable forks 300 can be replaced with one or more single prongs 700 which may be disposed through and any of bores 270 or slots 230 (FIG. 2). Each prong 700 comprises a pointed distal end and a threaded proximal end. A wing nut 360 is used to secure prong 700 to base 200 through bore 270 or slot 230.

Figure 8:
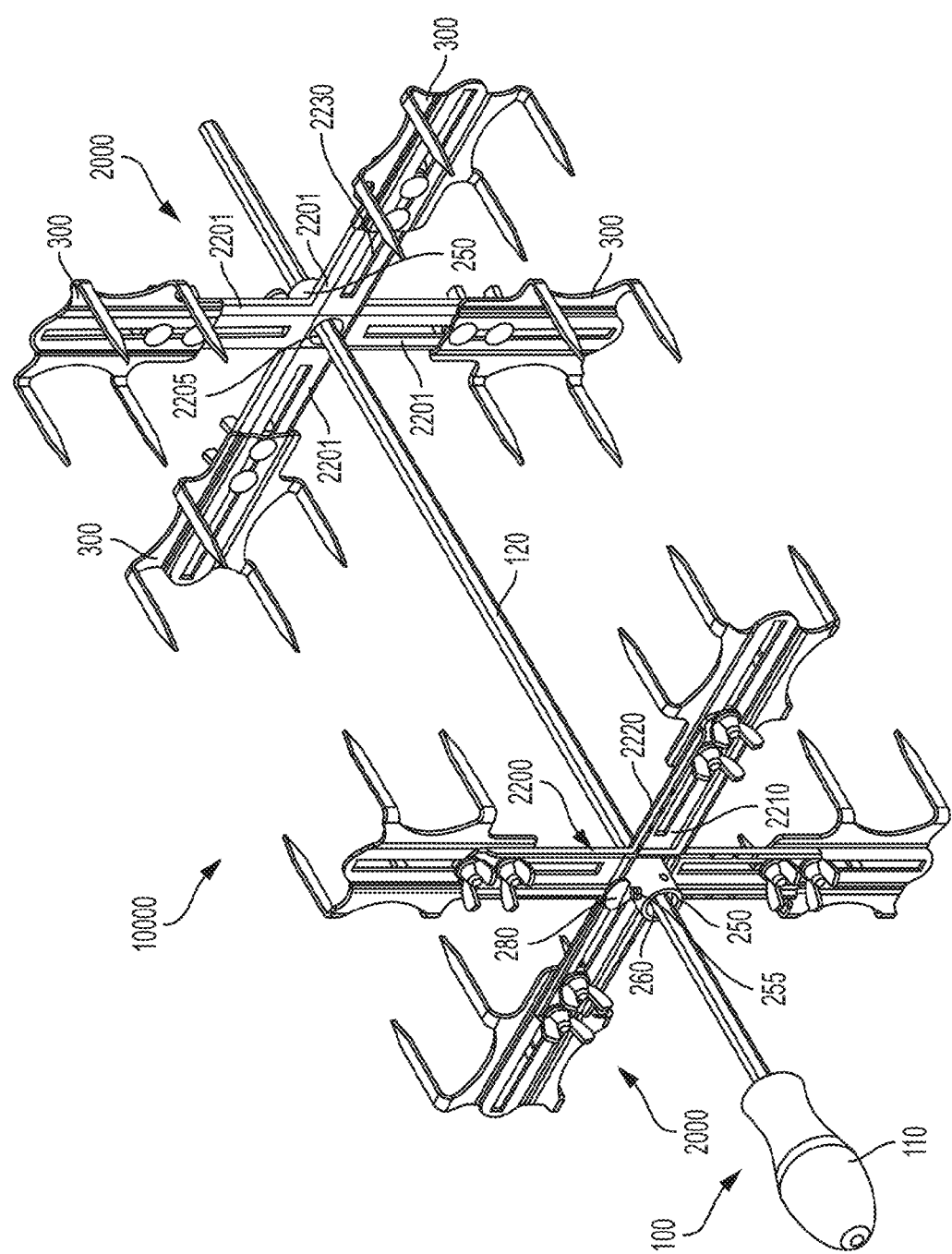
FIG. 8 shows a perspective view of an alternative exemplary embodiment of the present invention.

Referring now to FIG. 8, there is shown a perspective view of an alternative embodiment cooking apparatus 10000 with adaptors 2000 disposed along linearly movably attached to shaft 120 of rotisserie rod 100. As illustrated in FIG. 7, each adaptor 2000 comprises base 2200. Base 2200 comprises multiple arms 2201. Each arm 2201 extends radially from the center of base 2200 such that each arm 2201 is oriented at a 90 degree angle from two adjacent arms 2201. In other possible embodiments (not shown), arms 2201 could be at angles greater or lesser than 90 degrees relative to one another.

Referring still to FIG. 8, each rotisserie adaptor 2000 is selectively and slidably attached to shaft 120 of rotisserie rod 100. Rotisserie adaptors 2000 generally comprise a base 2200, a cylindrical connector 2250, and four slidable fork devices 300. Preferably all components of adaptors 2000 comprise a durable heat and corrosion resistant material such as stainless steel or aluminum. However, any food safe polymer, composite, or ceramic having the necessary material characteristics of mechanical durability as well as heat and corrosion resistance can also be used.

Referring again to FIG. 8, there is shown a front and rear perspective view of adaptor 2000. As illustrated in FIG. 7, base 2200 of adaptor 2000 comprises a generally flat cross-shaped bottom 2210 with four arms 2201. Each arm 2201 extends radially from the center of bottom 2210. Bottom 2210 of base 2200 further comprises flanges 2220 extending perpendicularly from opposing longer sides of each arm 2201. Bottom 2210 further comprises a central bore 2205 disposed through bottom 2210 and a pair of elongated slots 2230 disposed through each arm 2215 of base 2200.

Each slot 2230 is disposed on one side of central cylindrical bore 2205. Cylindrical connector 2250 is fixedly attached to the center of bottom 2210 and extends perpendicularly from bottom 2210 from the same side and in the same direction as flanges 220. Cylindrical connector 250 further comprises longitudinal bore 260. Bore 260 of cylindrical connector 250 is collinear with central bore 2205 of bottom 2210 of base 2200.

Referring still to FIG. 8, connector 250 comprises a cylindrical shape having a longitudinal bore 260. Connector 250 further comprises at least one cylindrical side bore 255 disposed through the side wall of connector 250 such that the central longitudinal axis of bore 255 is perpendicular to the central longitudinal axis of bore 260 of connector 250. Bore 255 is threaded and adapted to accept a threaded fastener or set screw 280 as shown in FIG. 1.

In a preferred embodiment, cylindrical connector 250 comprises at least two bores 255. The addition of at least a second bore 255 provided redundancy in the event that one of the bores becomes inoperable. Ideally, the second bore 255 is collinear with and disposed through cylindrical connector 250 opposite the first bore 255. Thus, if one bore become inoperable, adaptor 1000 may still be oriented in any desired rotation relative to rod 100.

Referring again to FIG. 8, shaft 120 of rotisserie rod 100 slides though cylindrical connectors 250 of adaptors 2000. Once each adaptor 2000 is in a desired linear location and desired rotational orientation, set screw 280 is threadably engaged through bore 255 of cylindrical connector 250 to hold adaptor 2000 and shaft 120 of rotisserie rod 100 in place relative to one another in a desired linear position and angular orientation.

In a preferred embodiment, set screw 280 comprises a thumb screw design so that it can be tightened or loosened by hand without the need for tools. As illustrated in FIG. 8, rotisserie adaptors 1000 further comprise movable forks 300.

Referring again to FIG. 8, each movable fork 300 comprises a bottom 310 having a generally flat elongated shape. Bottom 310 further comprises an elongated central slot 320 disposed through bottom 310. Movable forks 300 further comprise prongs 330 that extend perpendicularly from bottom 310 of each movable fork 300. In one exemplary embodiment, two parallel prongs 330 are fixedly attached to bottom 310 and extend from opposing sides of bottom 310. Each prong 330 preferably comprises a pointed distal end opposite the end fixedly attached to bottom 310.

Referring again generally to FIG. 8, there is shown cooking apparatus 10000. In one exemplary embodiment, at least one adaptor 2000 is releasably, slidingly, and selectively attached to shaft 120 of rod 100. Preferably, two adaptors 2000 are disposed linearly along shaft 120 of rotisserie rod 100 such that the points of prongs 330 of each adaptor 2000 face one another.

Referring still to FIG. 8, shaft 120 of rod 100 is disposed through cylindrical connector 250 and bore 2205 of base 2200 of adaptor 2000. Thumb screw 280 is selectively engagable through bore 255 to hold adaptors 2000 in place along shaft 120 of rotisserie rod 100.

Referring again to FIG. 8, there is shown forks 300 movably attached to base 2200 of adaptor 2000. As illustrated in FIG. 8, at least one movable fork 300 is slidingly attached to each arm 2215 of base 200. Each fork 300 is place on the top of one side of base 2200 such that side of movable forks 300 without prongs 330 slides along arm 2215. When each movable fork 300 is attached to base 2200, slot 320 of fork 300 is parallel to and above slot 2240. Bolts 340, as illustrated in FIG. 6, are disposed through slots 320 and 2240 such that each fork 300 is slidingly attached to one side of base 2200. Each fork 300 can thus move radially in or out from shaft 120. Once any fork 300 is in a desired location, a wing nut 360 is attached to bolt 340 on the side of base 2200 comprising connector 250 to hold fork 300 in place radially relative to shaft 120. In one exemplary embodiment, one fork 300 is attached to each opposing side of base 2200 on either side of bore 2205.

Figure 9:
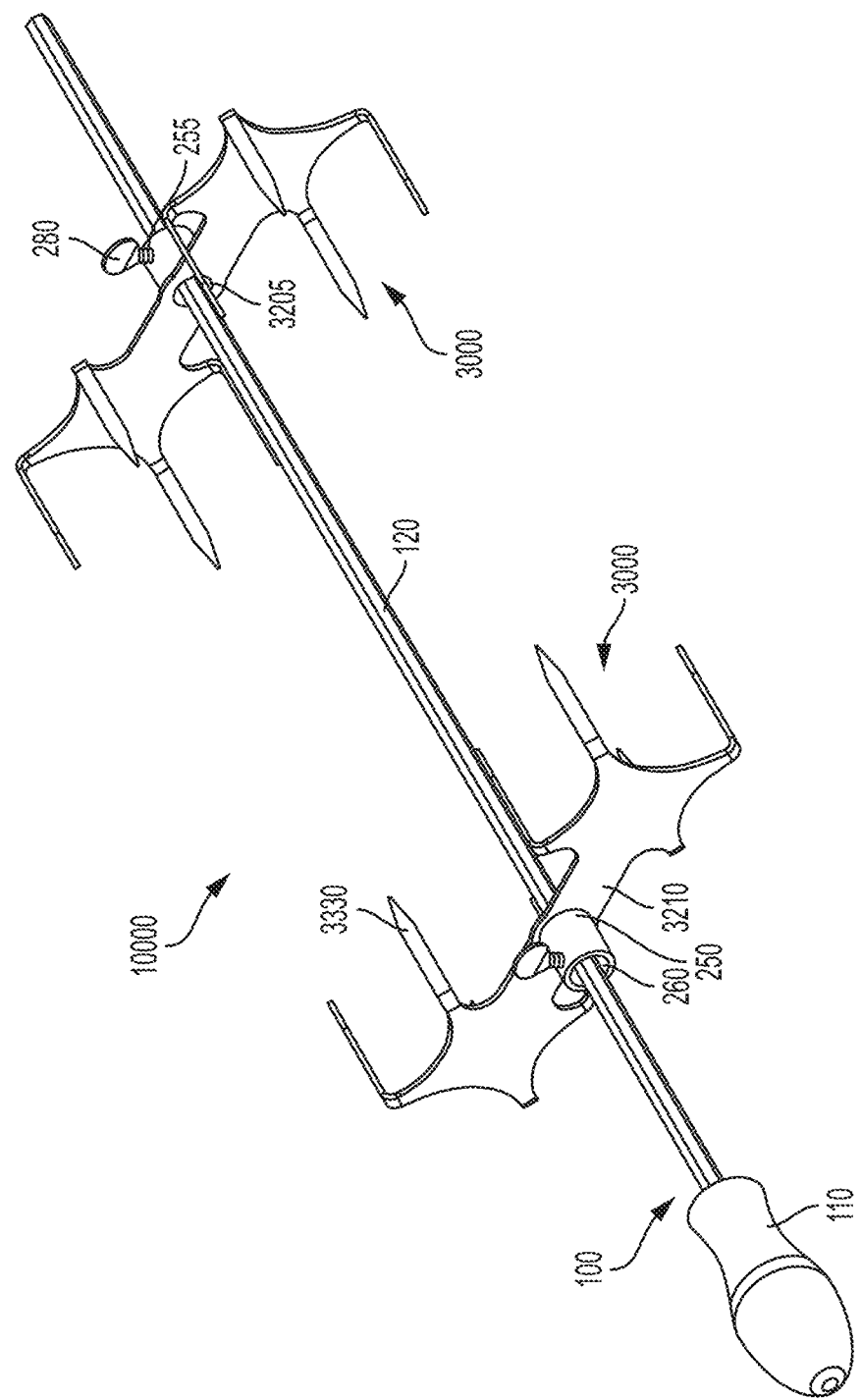
FIG. 9 shows a perspective view of another alternative exemplary embodiment of the present invention.

Referring next to FIG. 9, there is shown a perspective view of an alternative embodiment cooking apparatus 10000. Cooking apparatus 10000 generally comprises horizontally disposed rotisserie rod 100 and rotisserie adaptors 3000 each of which further comprises a base 3200 and a connector 250, and a pair of fixedly attached forks 3300. As shown in FIG. 8, rotisserie rod 100 is disposed generally horizontally. Rotisserie rod 100 comprises an elongated shaft 120 having a longitudinal axis. Rotisserie rod 100 preferably comprises a heat resistant durable material such as stainless steel or aluminum. However, any polymer, composite, or ceramic having the necessary material characteristics of mechanical durability as well as heat and corrosion resistance can also be used. Shaft 120 of rotisserie rod 100 may comprise the shape of any extruded regular or irregular polygon, such as a cylindrical shape, extruded octagon, or elongated cuboid shape. Rotisserie rod 100 further comprises a knob or handle 110 disposed on one end of rotisseries rod shaft 120. Knob 120 is used to manually rotate shaft 120 of rotisserie rod 100. It is, however, within the scope of the present invention, for knob 110 to instead comprise a hand crank. Moreover, an automated device such as a hydraulic or an electric motor may be used to rotate shaft 120 of rotisserie rod 100 about its longitudinal axis.

Referring still to FIG. 9, there is shown a pair of rotisserie adaptors 3000. As illustrated in FIG. 8, each rotisserie adaptor 3000 is selectively and slidably attached to shaft 120 of rotisserie rod 100. Rotisserie adaptors 3000 generally comprise a cylindrical connector 250, and a pair of fixed fork devices 3300. Preferably all components of adaptors 3000 comprise a durable heat and corrosion resistant material such as stainless steel or aluminum. However, any polymer, composite, or ceramic having the necessary material characteristics of mechanical durability as well as heat and corrosion resistance can also be used.

Referring still to FIG. 9, adaptor 3000 comprises a generally flat rectangular bottom 3210. Bottom 3210 further comprises a central bore 3205 disposed through bottom 3210. Cylindrical connector 250 is fixedly attached to the center of bottom 3210 and extends perpendicularly from bottom 3210. Cylindrical connector 250 further comprises longitudinal bore 260. Bore 260 of cylindrical connector 250 is collinear with central bore 3205 of bottom 3210 of adaptor 3000.

Referring again to FIG. 3, there is shown a detailed view of cylindrical connector 250. As illustrated in FIG. 3, connector 250 comprises a cylindrical shape having a longitudinal bore 260. Connector 250 further comprises at least one cylindrical side bore 255 disposed through the side wall of connector 250 such that the central longitudinal axis of bore 255 is perpendicular to the central longitudinal axis of bore 260 of connector 250. Bore 255 is threaded and adapted to accept a threaded fastener or set screw 280 as shown in FIG. 9. In a preferred embodiment, cylindrical connector 250 comprises at least two bores 255. The addition of at least a second bore 255 provided redundancy in the event that one of the bores becomes inoperable. Ideally, the second bore 255 is collinear with and disposed through cylindrical connector 250 opposite the first bore 255. Thus, if one bore become inoperable, adaptor 1000 may still be oriented in any desired rotation relative to rod 100.

Referring again to FIG. 9, shaft 120 of rotisserie rod 100 slides though cylindrical connectors 250 of adaptors 3000. Once each adaptor 3000 is in a desired linear location and desired rotational orientation, set screw 280 is threadably engaged through bore 255 of cylindrical connector 250 to hold adaptor 3000 and shaft 120 of rotisserie rod 100 in place relative to one another in a desired position and orientation. In a preferred embodiment, set screw 280 comprises a thumb screw design so that it can be tightened or loosened by hand without the need for tools. As illustrated in FIG. 9, rotisserie adaptors 3000 further comprise fixedly integrated forks 3300.

Referring now to FIG. 4, each fork 300 comprises prongs 330 that extend perpendicularly from bottom fork 300. In one exemplary embodiment, two parallel prongs 330 are fixedly attached to bottom 210 and extend from opposing sides of bottom 210. Each prong 330 preferably comprises a pointed distal end opposite the end fixedly attached to bottom 210.

Referring again generally to FIG. 9, there is shown cooking apparatus 3000. In one exemplary embodiment, at least one adaptor 3000 is releasably, slidingly, and selectively attached to shaft 120 of rod 100. Preferably, two adaptors 3000 are disposed linearly along shaft 120 of rotisserie rod 100 such that the points of prongs 3330 of each adaptor 3000 face one another. However prongs 3330 of each adaptor 3000 may face opposite directions or the same direction.

Referring still to FIG. 9, shaft 120 of rod 100 is disposed through cylindrical connector 250 and bore 205 of base 3200 of adaptor 3000. Thumb screw 280 is selectively engagable through bore 255 to hold adaptors 3000 in place along shaft 120 of rotisserie rod 100.

Figure 10:
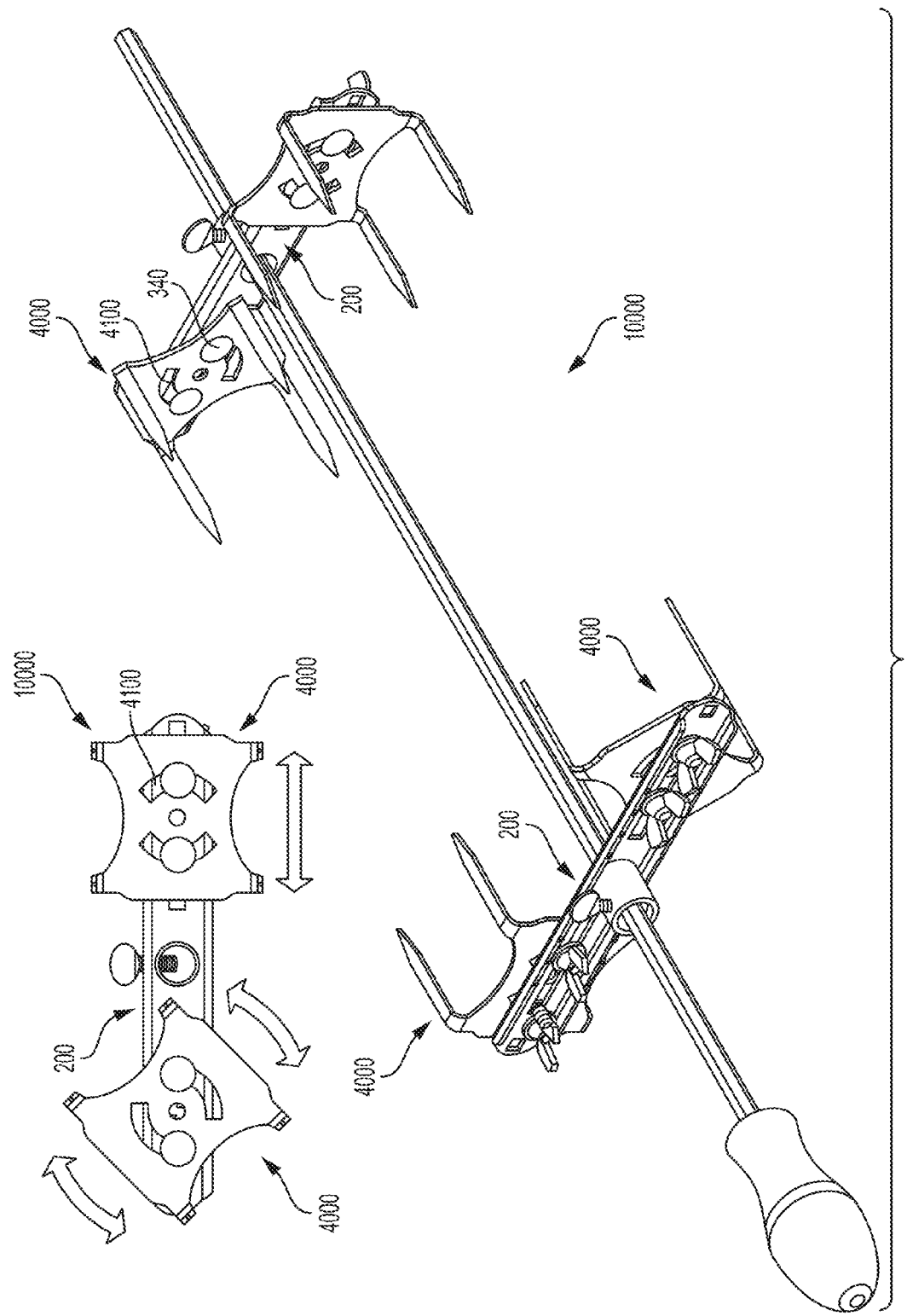
FIG. 10 shows a perspective view of another alternative exemplary embodiment of the present invention.

Referring now to FIG. 10, there is shown an alternative embodiment of the present invention 10000. In the embodiment of FIG. 10, forks 4000 comprise a pair of arcuate radial slots 4100 in base 200. Bolts 340 slidably engage with slots 4100 and slots 230 such that forks 400 are selectively rotatably and slidingly attached to base 200.

Figure 12:
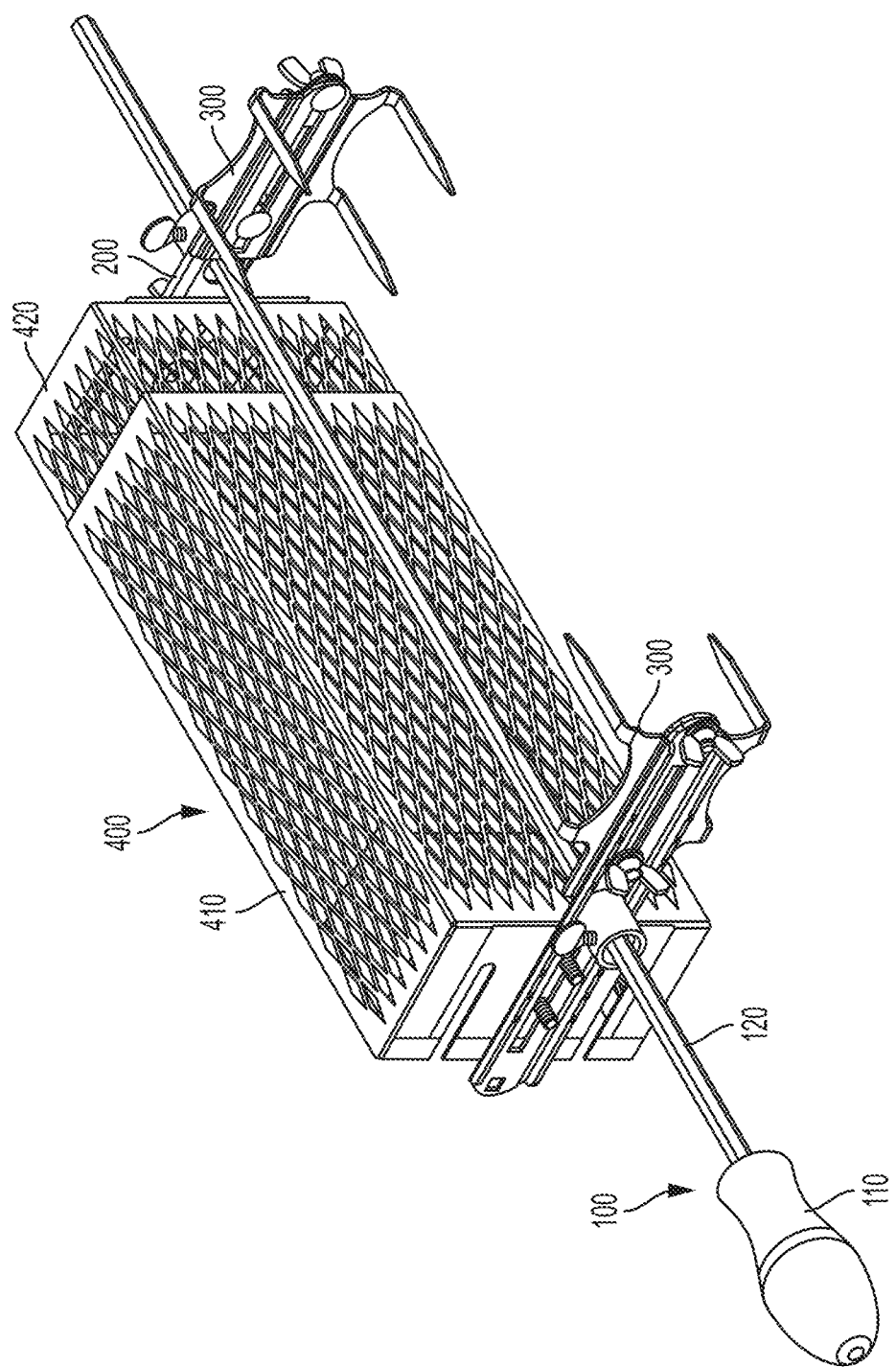
FIG. 12 shows a perspective view of an exemplary embodiment of another aspect of the present invention.

Referring now to FIGS. 12, 14, 15, and 16, the present invention may further comprises an expandable basket 400. Expandable basket 400 preferably comprises a food safe durable heat resistant material such as stainless steel, aluminum, or a suitably durable and heat resistant polymer or composite. As illustrated in FIG. 12, basket 400 generally comprises an external sleeve 410 having a generally elongated cuboid shape and a webbed exterior. Sleeve 410 comprises five sides with an open top portion. Expandable basket 400 further comprises an internal reciprocating inner box 420. Box 420 generally comprises a five sided extruded cuboid shape having an open bottom and webbed sides. However, basket 400 may instead comprise nested cylinders. As further illustrated in FIG. 12, box 420 is slidably disposed within sleeve 410. The bottom of sleeve 410 is releasably attached to one side of a base 200. The top of box 420 is releasably attached to another opposing base 200. As described above, each base 200 is movably attached along shaft 120 of rotisserie rod 100. Thus, the length of expandable basket 400 can be altered by moving each base 200 along shaft 120.

Figure 13:
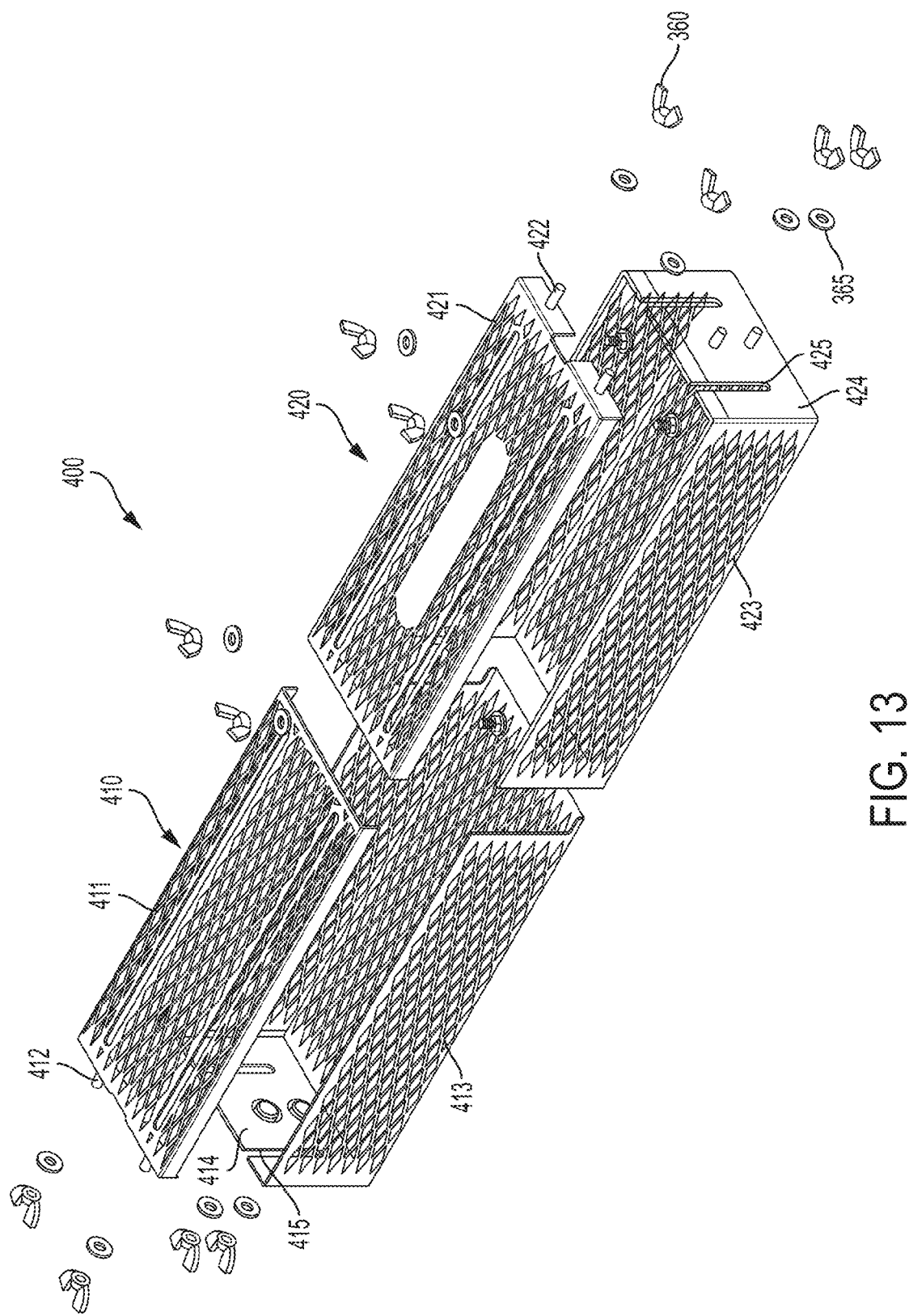
FIG. 13 shows an exploded perspective view of an exemplary embodiment of another aspect of present invention.

Referring now to FIG. 13, basket 400 is also laterally expandable. In FIG. 13, there is shown an exploded assembly view of box 400 in accordance with the present invention. As illustrated in FIG. 13, box 400 generally comprises outer sleeve assembly 410 and inner reciprocating member 420. Outer sleeve 410 of expandable basket 400 comprises top 411 having a pair of parallel threaded dowels 412 extending from end plate 414. Sleeve 410 further comprises sleeve base 413. Sleeve base 413 comprises a generally cuboid shape having a bottom, two sides, and an end plate 414. As further illustrated in FIG. 13, top 411 of sleeve 410 maybe disposed atop sleeve base 413 such that dowel rods 412 of top 411 may slide into slots 415 of end plate 414 of sleeve base 412. Thus, top 411 can be disposed within base 413 at a variable height. As further illustrated in FIG. 13, once top 411 is a desired height relative to base 413, top 411 can be secured at a selected height using wing nuts 360 and washers 365 as shown for example in FIG. 14.

Expandable basket 400 further comprises inner reciprocating member 420. Inner reciprocating member 420 comprises member base 423 generally comprising a flat bottom, two vertical sides, and vertical end wall 425. End wall 424 further comprises vertical slots 425. As further illustrated in FIG. 13, threaded dowels 422 slide within slots 425 when top 421 is disposed within base 423. Again, as illustrated in FIG. 14, wing nuts 360 in combination with washers 365 are used to retain top 421 within base 423 at a selected height.

Figure 14:
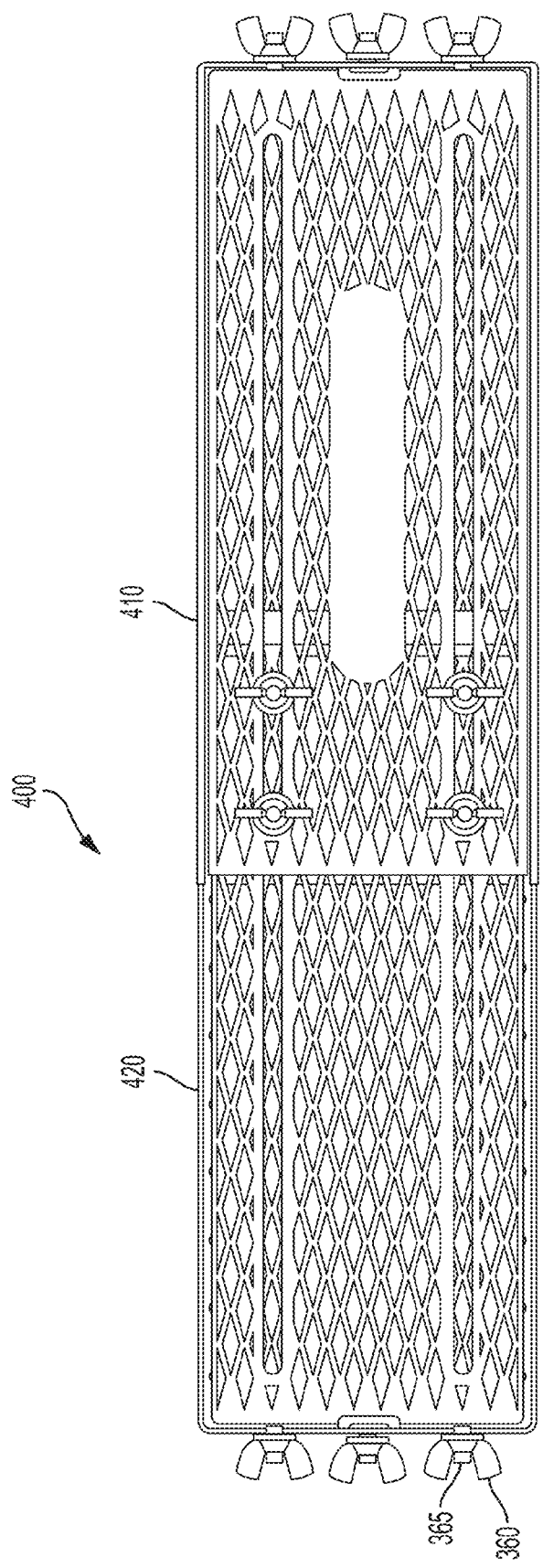
FIG. 14 shows an exemplary assembly view of the apparatus of FIG. 13 with the apparatus fully expanded.
Figure 15:
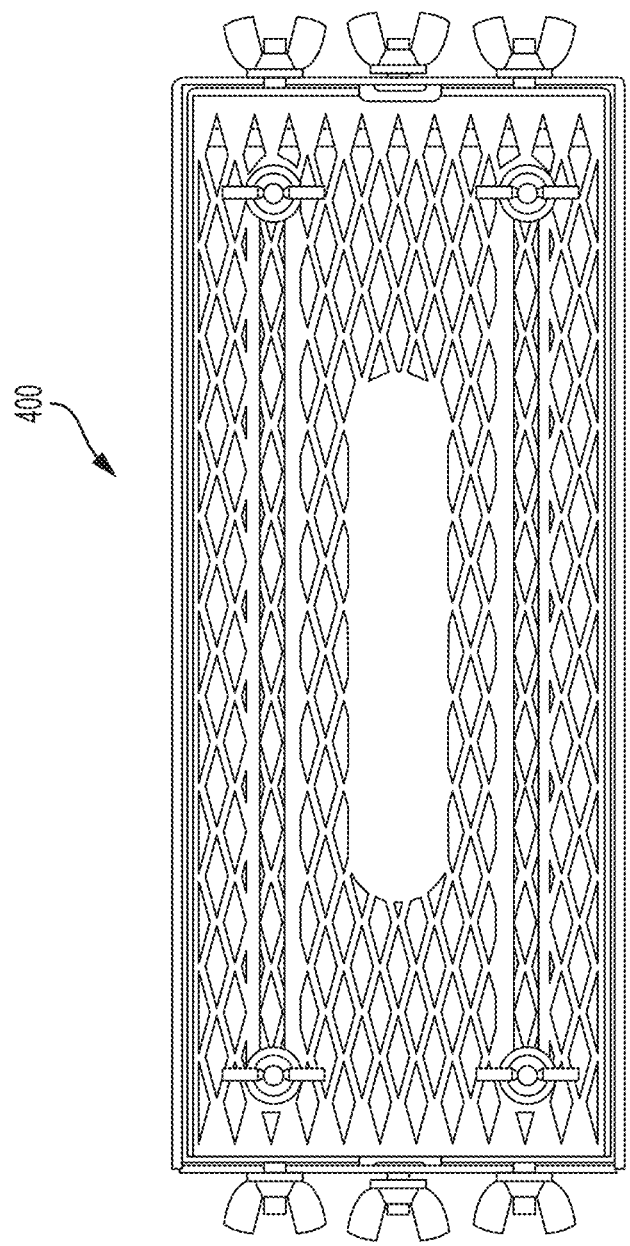
FIG. 15 shows the apparatus of FIG. 13 with an apparatus fully closed.
Figure 17:
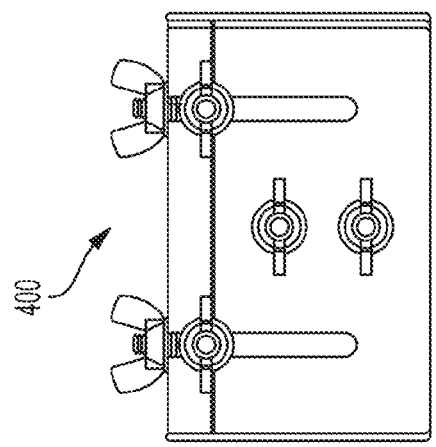
FIG. 17 shows an end of the apparatus of FIG. 13.
Figure 16:
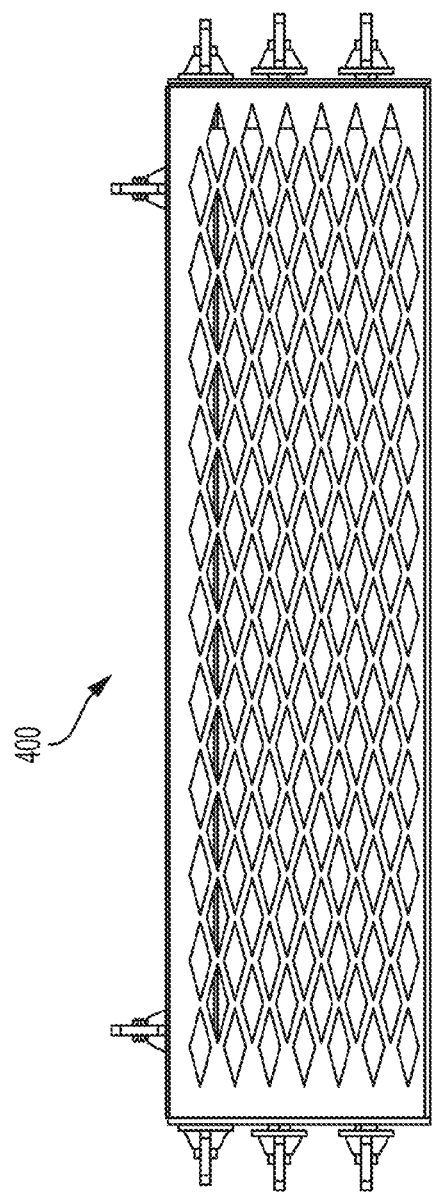
FIG. 16 shows side view of the apparatus of FIG. 13.

Once sleeve 410 and reciprocating member 420 are assembled, as shown in FIG. 14, member 420 is slidably disposed within sleeve 410. As shown in FIGS. 14 and 15, basket 400 has variable length as member 420 is slid within sleeve 410. Additionally, as illustrated in FIG. 13, tops 411 and 421 are disposed within bases 413 and 423 such that basket 400 is expandable laterally (laterally relative to a rotisserie rod 100).

Referring now to FIGS. 12 and 13 in combination, it is shown that tops 411 and 421 are slidably disposed within bases 413 and 423 such that in addition to basket 400 being linearly expandable, basket 400 is expandable laterally relative to rotisserie rod 100 by sliding threaded dowel rods 412 and 422 within slots 415 and 425 respectively.

Figure 18:
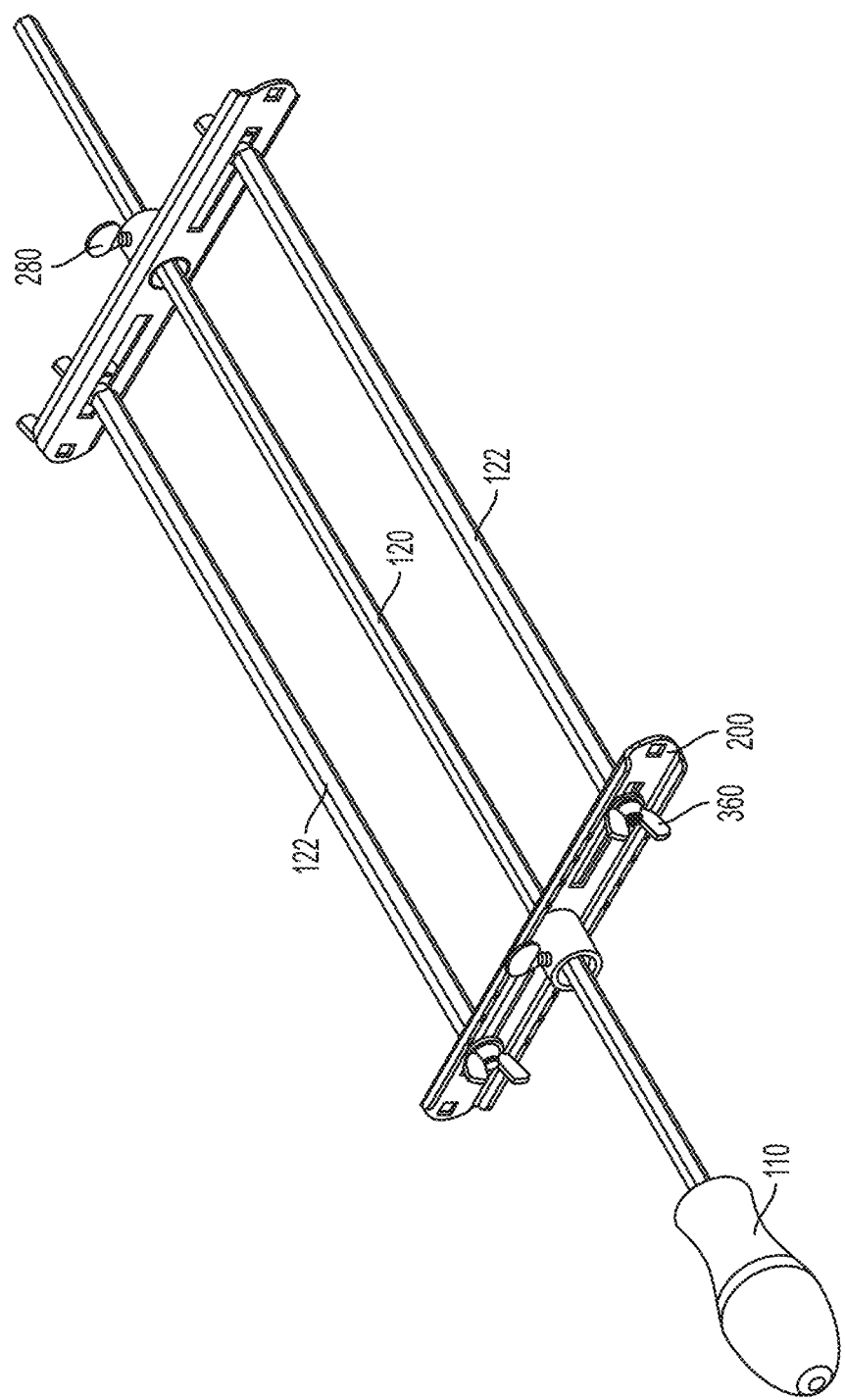
FIG. 18 shows another exemplary embodiment of the present invention.

Referring now generally to FIG. 18, there is shown an exemplary alternative embodiment of the present invention wherein cooking apparatus 10000 further comprises two additional rods 122 disposed horizontally to shaft 120 of rotisserie rod 100. As illustrated in FIG. 12, each rod 112 comprises a distal and proximal threaded end. Threaded ends of rods 122 are threadably attached to bases 200 preferably using a wing nut 360 or other fastening device that can be tightened by hand.

Similarly, FIG. 18(A) shows the apparatus of FIG. 18, wherein cooking apparatus 10000 comprises two pairs of rods 122 disposed on either side of and in parallel to rotisserie rod 100. As illustrated in FIG. 18(A), an apparatus in accordance with the present invention may comprise any desired number of rods 122 as well as any desired number of comprising additional adaptors, such as adaptor 1000.

Figure 19:
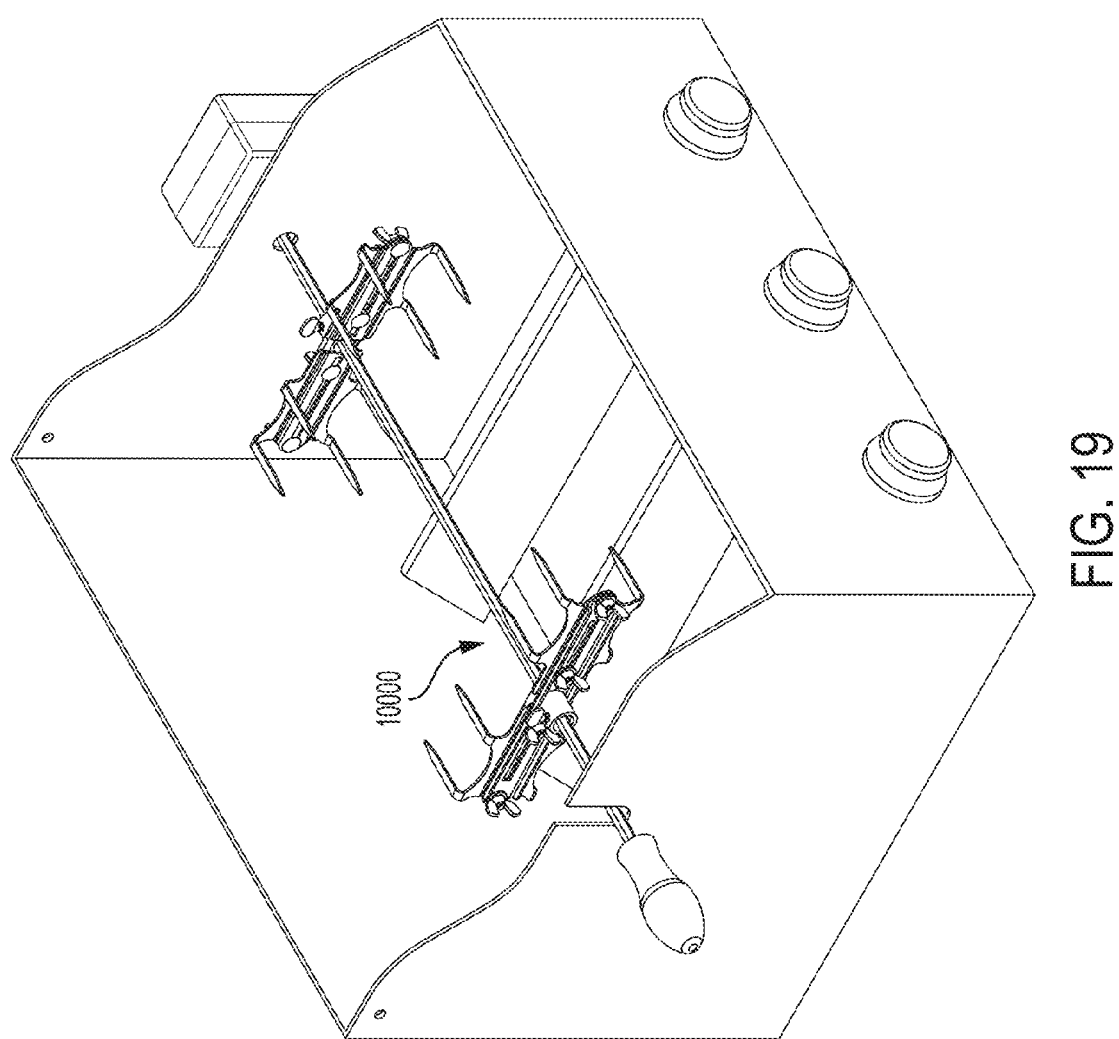
FIG. 19 shows an example of the present invention disposed above a heat source.
Figure 21:
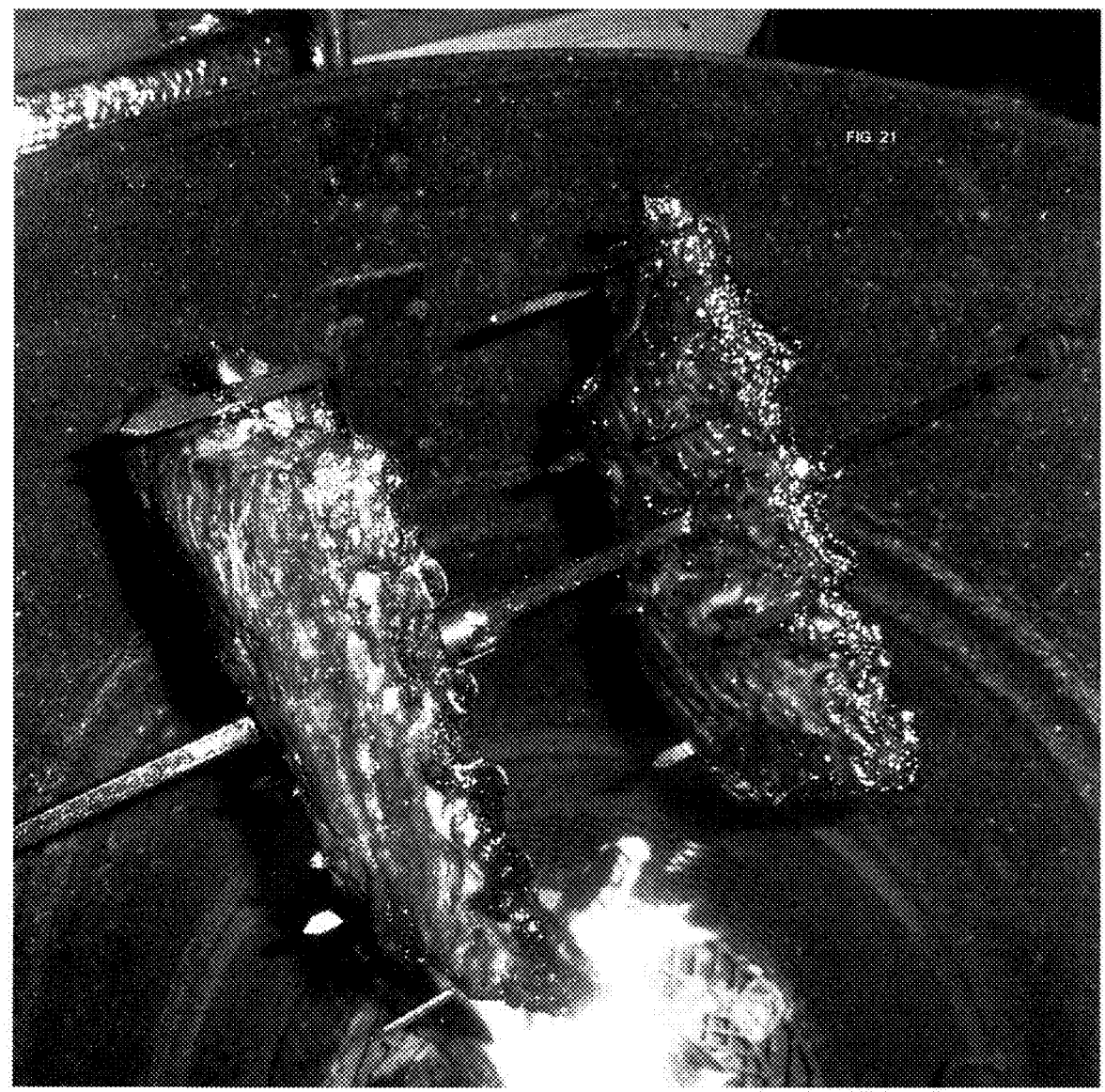
FIG. 21 shows a photograph of an experimental use of the present invention.
Figure 22:
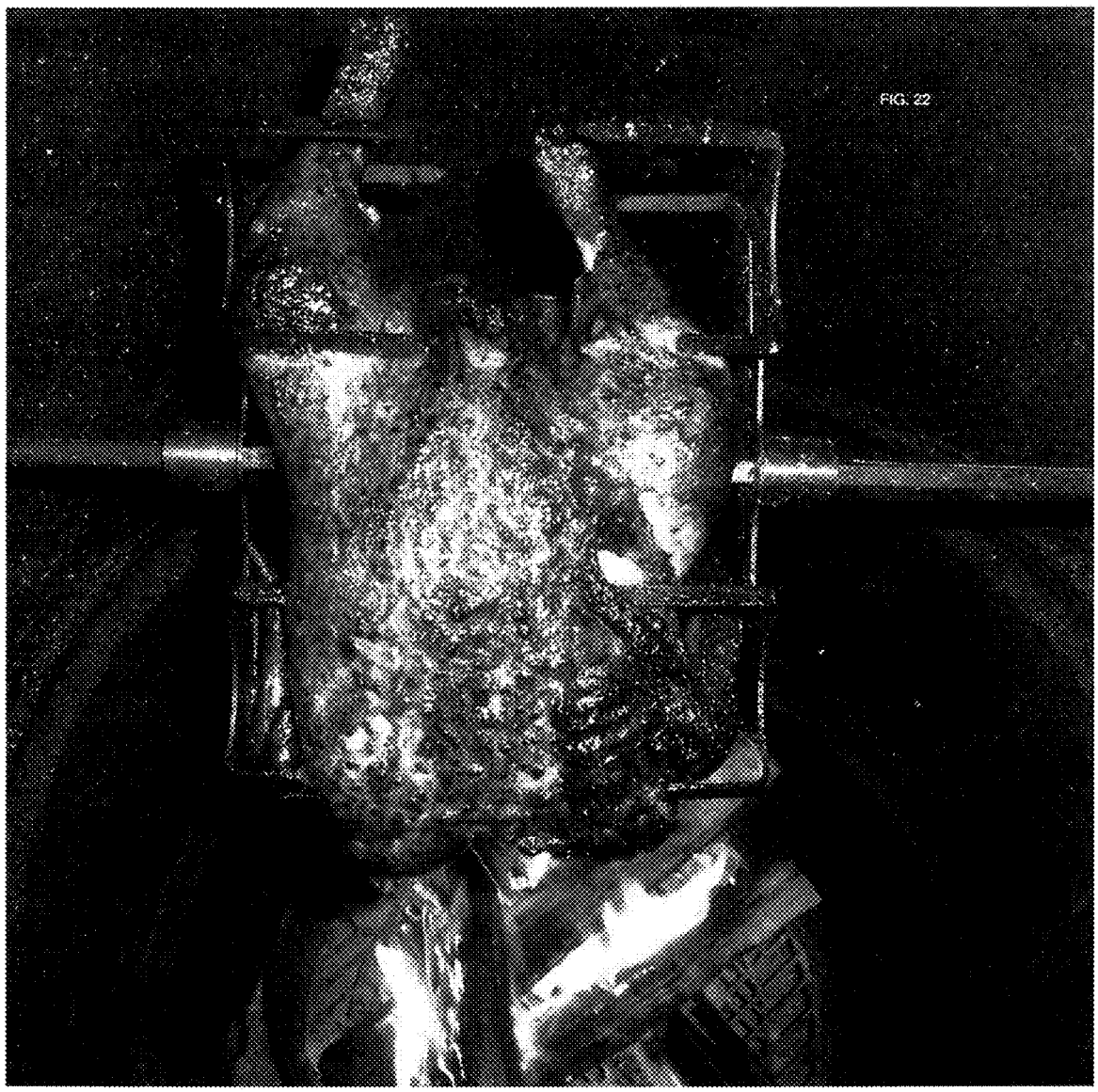
FIG. 22 shows a photograph of another experimental use of the present invention.
Figure 23:
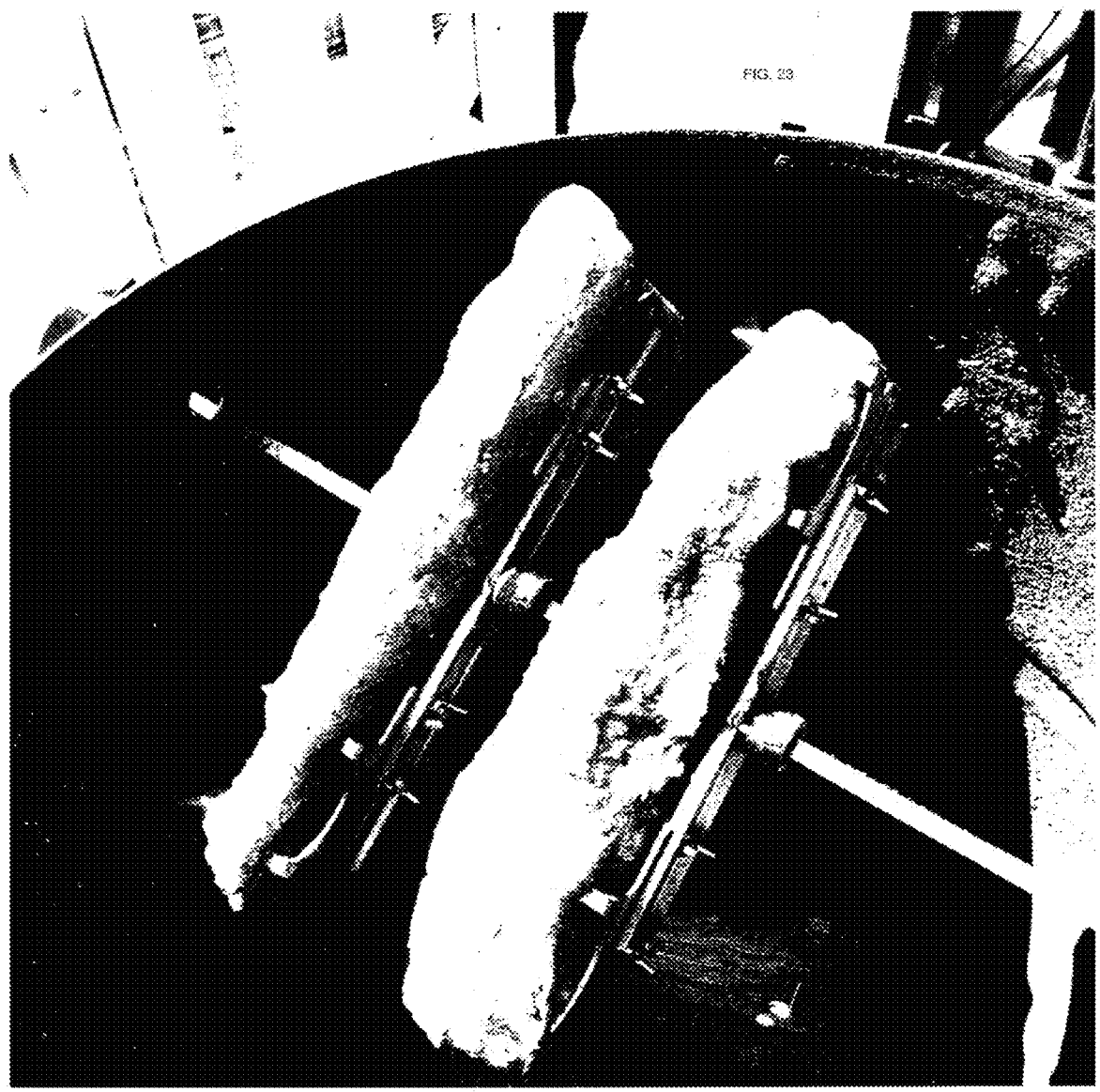
FIG. 23 shows a photograph of another experimental use of the present invention.
Figure 24:
FIG. 24 shows a photograph of another experimental use of the present invention.

Referring now to FIGS. 19 and 20, there is shown an exemplary use of cooking apparatus 10000 disposed over a heat source. Those of skill in the art will appreciate that the heat source for use with the present invention may comprises a smoker, a gas grill, a charcoal grill, a fire pit, or the like.

Advantageously, cooking apparatus 10000 of the present invention allows more food product to cook simultaneously within a particular cooking space. Additionally, rotisserie meats may be cooked at higher temperatures with less chance of burning thereby saving cooking time up to 75% and allowing food to cook more evenly. Moreover, apparatus 10000 of the present invention allows meats such as ribs to spin and "self baste" unlike current methods of cooking on a rotisserie. Contamination of meat juices by dripping on other meats in a stacked arrangement is also eliminated.

Figure 25:
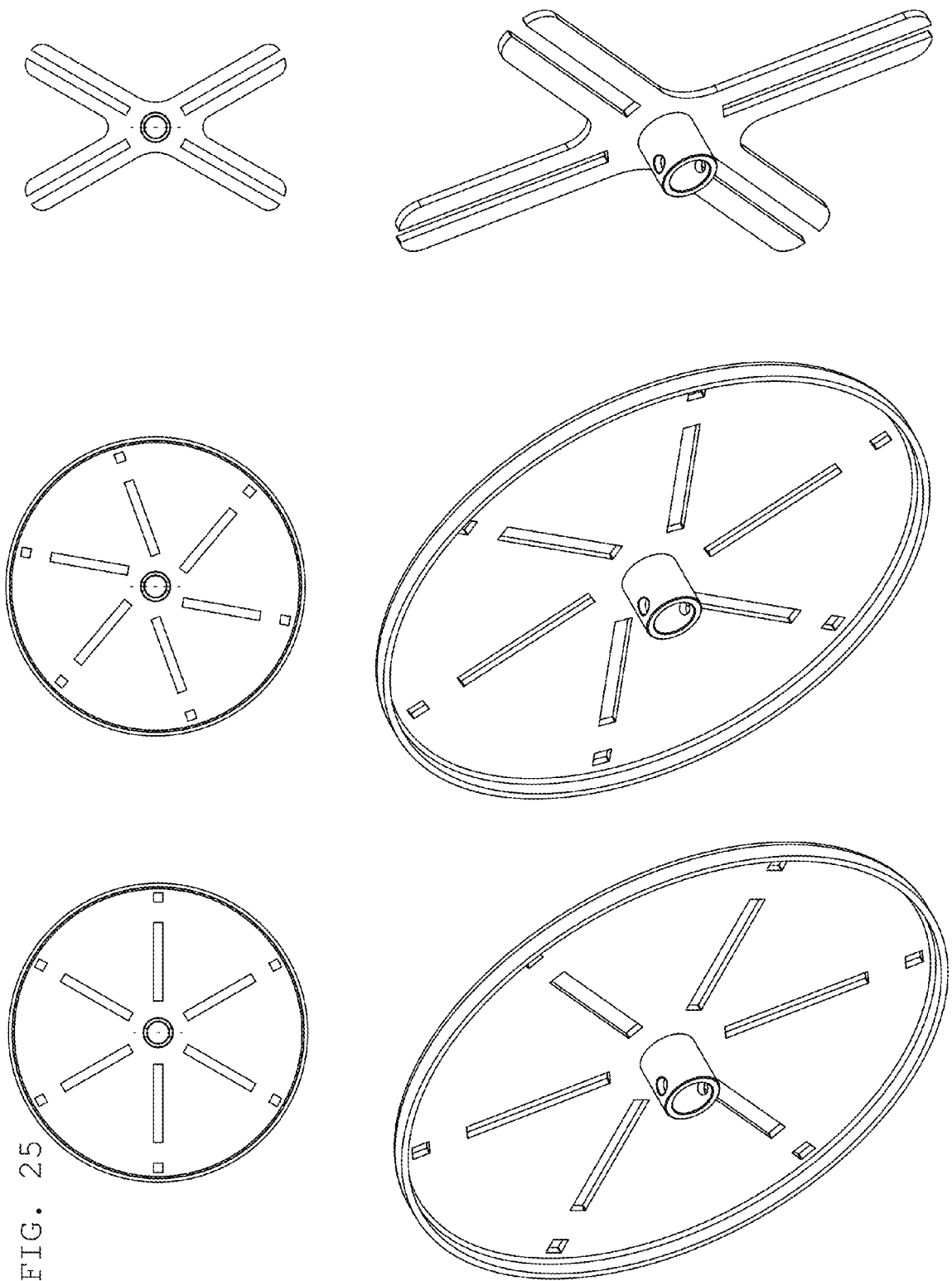
FIG. 25 shows several alternative examples of a component of the present invention.

In use, a user places meat on apparatus 10000 vertically over a standard grill. Apparatus 10000, thus, allows a user to evenly extend the meats outward from both sides of the spit utilizing more cooking space. Moreover, the vertical arrangement of meat and changes the meats physical profile to being more narrow rather than flat (broad) which helps with achieving even heat distribution and the less chance of burning. The subsequent vertical rotation also truly rotates the meats in such a way so that both sides cook evenly. Other examples of apparatus 10000 in use are shown in FIGS. 21, 22, 23, and 24. Additionally, other exemplary embodiments of component 1000 are shown in FIGS. 25 and 26.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A rotisserie rod adaptor apparatus, said apparatus comprising:
   a base, said base having a generally flat rectangular shape, a top surface, and a bottom surface, said base further comprising a bore disposed between said base top surface and said base bottom surface, said base further comprising a connector extending along an axis about which said apparatus is operably rotatable, said connector fixedly attached to said bottom surface of said base;
   at least one adjustable fork assembly, said fork assembly having a base, said fork assembly base having a generally flat rectangular shape, a top surface, a bottom surface, and opposing sides, said fork assembly base further comprising at least one prong attached to each opposing side of said fork assembly base, said prong extending perpendicularly relative to said fork assembly base, said bottom surface of said fork assembly base selectively, releasably, and slidably disposed against said top surface of said base of said apparatus, said fork assembly prong having a plurality of selectively fixed positions relative to said base of said apparatus that are located at different radial distances from said axis.

2. The apparatus of claim 1, comprising two adjustable fork assemblies wherein a first fork assembly is selectively, releasably, and slidably disposed against said top surface of said base of said apparatus on one side of said connector and a second fork assembly is selectively, releasably, and slidably disposed against said top surface of said base of said apparatus on another side of said connector.

3. The apparatus of claim 1, wherein said connector comprises at least one transverse through hole.

4. The apparatus of claim 1, wherein said connector comprises two collinear, opposing, transverse through holes.

5. A rotisserie rod adaptor apparatus, said apparatus comprising:
   a base, said base having a generally flat rectangular shape, a top surface, and a bottom surface, said base further comprising a bore disposed between said top surface and said bottom surface, said base further comprising a connector, said connector fixedly attached to said bottom surface of said base;
   at least one adjustable fork assembly, said fork assembly having a base, said fork assembly base having a generally flat rectangular shape, a top surface, a bottom surface, and opposing sides, said fork assembly base further comprising at least one prong attached to each opposing side of said fork assembly base, said prong extending perpendicularly relative to said fork assembly base, said bottom surface of said fork assembly base selectively, releasably, and slidably disposed against said top surface of said base of said apparatus;
   a longitudinal slot disposed between said top surface of said base of said apparatus and said bottom surface of said base of said apparatus on each side of said bore;
   a longitudinal slot disposed between said top surface and said bottom surface of said fork assembly base, said longitudinal slot of said fork assembly base disposed atop one of said longitudinal slots of said base of said apparatus; and
   at least one fastener releasably disposed through said fork assembly base slot and through said apparatus base slot.

6. The apparatus of claim 5, wherein said fastener comprises:
   a threaded bolt disposed through said slots, said bolt having a cap, said cap having a diameter greater than the width of either of said slots; and
   a wing nut, said wing nut threadably connected to said bolt opposite said cap.

7. A rotisserie rod adaptor apparatus, said apparatus comprising:
   a base, said base having a generally flat rectangular shape, a top surface, and a bottom surface, said base further comprising a bore disposed between said top surface and said bottom surface, said base further comprising a connector, said connector fixedly attached to said bottom surface of said base; and
   at least one adjustable fork assembly, said fork assembly having a base, said fork assembly base having a generally flat rectangular shape, a top surface, a bottom surface, and opposing sides, said fork assembly base further comprising at least one prong attached to each opposing side of said fork assembly base, said prong extending perpendicularly relative to said fork assembly base, said bottom surface of said fork assembly base selectively, releasably, and slidably disposed against said top surface of said base of said apparatus;
   wherein at least one side of said base of said apparatus has at least one prong directly connected to said base of said apparatus.

8. The apparatus of claim 7, wherein said at least one prong is fixedly connected to said base of said apparatus.

9. The apparatus of claim 7, wherein said at least one prong is removably connected to said base of said apparatus.

10. An adjustable food holding apparatus, said apparatus comprising:

a base, said base having a generally flat rectangular shape, a top surface, and a bottom surface, said base further comprising a bore disposed between said top surface and said bottom surface;

a connector defining an axis about which said apparatus is operably rotatable, said connector fixedly attached to said bottom surface of said base;

at least one adjustable fork assembly, said fork assembly having a base, said fork assembly base having a generally flat rectangular shape, a top surface, a bottom surface, and opposing sides, said fork assembly base further comprising at least one prong attached to each opposing side of said fork assembly base, said prong extending perpendicularly relative to said fork assembly base, said bottom surface of said fork assembly base selectively, releasably, and slidably disposed against said top surface of said base of said apparatus, said fork assembly prong having a plurality of selectively fixed positions relative to said base of said apparatus that are located at different radial distances from said axis; and a rod, said rod selectively, slidingly, releasably disposed through said connector of said base of said apparatus.

11. The apparatus of claim 10, further comprising:
a first fork assembly selectively, slidingly, releasably disposed on said rod through said connector of said base of said apparatus; and
a second fork assembly selectively, slidingly, releasably disposed on said rod through said connector of said base of said apparatus.

12. The apparatus of claim 11, wherein said first and second fork assemblies are oriented such that said prongs of said first fork assembly face said prongs of said second fork assembly.

13. The apparatus of claim 11, wherein said first and second fork assemblies are oriented such that said prongs of said first fork assembly and said prongs of said second fork assembly face the same direction.

14. The apparatus of claim 13, wherein said fork assemblies abut one another.

15. The apparatus of claim 14, wherein the fork assemblies are rotated 90 degrees relative to one another.

16. The apparatus of claim 10, comprising two adjustable fork assemblies wherein a first fork assembly is selectively, releasably, and slidably disposed against said top surface of said base of said adjustable food holding apparatus on one side of said connector and a second fork assembly is selectively, releasably, and slidably disposed against said top surface of said base of said adjustable food holding apparatus on another side of said connector.

17. The apparatus of claim 10, wherein said connector comprises at least one transverse through hole.

18. The apparatus of claim 10, wherein said connector comprises two collinear, opposing, transverse through holes.

19. An adjustable food holding apparatus, said apparatus comprising:
a base, said base having a generally flat rectangular shape, a top surface, and a bottom surface, said base further comprising a bore disposed between said top surface and said bottom surface;
a connector, said connector fixedly attached to said bottom surface of said base;
at least one adjustable fork assembly, said fork assembly having a base, said fork assembly base having a generally flat rectangular shape, a top surface, a bottom surface, and opposing sides, said fork assembly base further comprising at least one prong attached to each opposing side of said fork assembly base, said prong extending perpendicularly relative to said fork assembly base, said bottom surface of said fork assembly base selectively, releasably, and slidably disposed against said top surface of said base of said adjustable food holding apparatus;
a rod, said rod selectively, slidingly, releasably disposed through said connector of said base of said apparatus;
a longitudinal slot disposed between said top surface of said base of said apparatus and said bottom surface of said base of said apparatus on each side of said bore;
a longitudinal slot disposed between said top surface and said bottom surface of said fork assembly base, said longitudinal slot of said fork assembly base disposed atop one of said longitudinal slots of said base of said apparatus; and
at least one fastener releasably disposed through said fork assembly base slot and through said apparatus base slot.

20. The apparatus of claim 19, wherein said fastener comprises:
a threaded bolt disposed through said slots, said bolt having a cap, said cap having a diameter greater than the width of either of said slots; and
a wing nut, said wing nut threadably connected to said bolt opposite said cap.

21. The apparatus of claim 10, wherein at least one side of said base of said apparatus has at least one prong directly connected to said base of said apparatus.

22. The apparatus of claim 21, wherein said at least one prong is fixedly connected to said base of said apparatus.

23. The apparatus of claim 21, wherein said at least one prong is removably connected to said base of said apparatus.

24. The apparatus of claim 10, further comprising at least two spit rods disposed in parallel to one another.

25. The apparatus of claim 10, further comprising at least three spit rods disposed in parallel to one another.

26. The apparatus of claim 10, further comprising a heat source, said heat source selected from the group consisting of a gas grill, an electric grill, a charcoal grill, a fire pit, a smoker, and a barrel grill, wherein said rod is horizontally rotatably disposed above said heat source.

27. An adjustable rotisserie adaptor apparatus, said apparatus comprising:
a base, said base having a generally flat rectangular shape, a top surface, and a bottom surface, said base further comprising a bore disposed between said base top surface and said base bottom surface, said base comprising a slot disposed therethrough on each side of said bore;
a connector, said connector fixedly attached to said base bottom surface collinearly with said bore of said base;
a fork subassembly, said fork subassembly comprising a base having a pair of arcuate slots disposed therethrough, said fork subassembly base further comprising at least one prong extending therefrom;
said fork subassembly disposed on said base;
a fastener, said fastener selectively disposed through each of said arcuate slots and said base slot such that said fork subassembly is rotatably, slidably, and releasably attached to said base.

* * * * *